United States Patent
Shirakata et al.

(10) Patent No.: US 6,618,352 B1
(45) Date of Patent: Sep. 9, 2003

(54) MODULATOR, DEMODULATOR, AND TRANSMISSION SYSTEM FOR USE IN OFDM TRANSMISSION

(75) Inventors: Naganori Shirakata, Suita (JP); Yasuo Harada, Kobe (JP); Hiroshi Hayashino, Himeji (JP); Koichiro Tanaka, Takarazuka (JP); Hideki Nakahara, Kyoto (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/317,961

(22) Filed: May 25, 1999

(30) Foreign Application Priority Data

May 26, 1998 (JP) ............................ 10-144848

(51) Int. Cl.⁷ ................................ H04J 11/00
(52) U.S. Cl. .................. 370/203; 370/342; 370/343; 375/136
(58) Field of Search .................. 370/204, 205, 370/206, 210, 215, 478

(56) References Cited

U.S. PATENT DOCUMENTS

| | | | | |
|---|---|---|---|---|
| 5,694,389 A | * | 12/1997 | Seki et al. ................. | 370/208 |
| 5,822,323 A | * | 10/1998 | Kaneko et al. ............. | 370/210 |
| 5,838,734 A |   | 11/1998 | Wright | |
| 5,898,665 A | * | 4/1999 | Sawahashi et al. ......... | 370/342 |
| 5,946,292 A | * | 8/1999 | Tsujishita et al. .......... | 370/204 |
| 5,956,318 A | * | 9/1999 | Saeki ........................ | 370/206 |
| 5,959,965 A | * | 9/1999 | Ohkubo et al. ............. | 370/203 |
| 5,987,063 A | * | 11/1999 | Rinne ........................ | 375/226 |
| 6,130,915 A | * | 10/2000 | Hallier et al. .............. | 370/343 |
| 6,320,917 B1 | * | 11/2001 | Stott et al. ................. | 375/326 |
| 6,341,123 B1 | * | 1/2002 | Tsujishita et al. .......... | 370/210 |

FOREIGN PATENT DOCUMENTS

| | | |
|---|---|---|
| EP | 0 618 697 | 10/1994 |
| EP | 0 820 171 | 7/1998 |
| JP | 5-83218 | 4/1993 |
| JP | 8-125632 | 5/1996 |
| JP | 8-265293 | 10/1996 |
| JP | 10-75226(JP2772286) | 4/1998 |
| JP | 6-311134(JP2781946) | 5/1998 |
| JP | 10-190609 | 7/1998 |
| WO | 95 19671 | 7/1995 |

OTHER PUBLICATIONS

Patent Abstracts of Japan, by Sato Makoto et al., entitled "OFDM Synchronization Demodulation Circuit", dated Apr. 16, 1996, 1 page.

Moose, Paul H., entitled "Differentially Coded Multi–Frequency Modulation for Digital Communications", Proceedings of EUSIPCO–90 Fifth European Signal Professing Conference, Barcelona, Spain, Sep. 18–21, 1990.

Nogami, H., et al., entitled "A Frequency and Timing Period Acquisition Technique of OFDM Systems", IECE Trans Commun., pp. 1135–1146, Aug. 8, 1996.

* cited by examiner

Primary Examiner—Hassan Kizou
Assistant Examiner—David Odland
(74) Attorney, Agent, or Firm—Wenderoth, Lind & Ponack, L.L.P.

(57) ABSTRACT

An input of an OFDM signal containing known pilot carriers among given subcarriers is separated into subcarriers through Fourier transform in a fast Fourier transform unit. A data carrier phase error estimating unit obtains an amount of phase correction of each subcarrier on the basis of the pilot carriers in the separated subcarriers. A data carrier phase correcting unit corrects the phase of the separated subcarrier signal on the basis of the amount of phase correction. Thus, the phase errors of the subcarriers can be corrected and the OFDM symbols can be demodulated even if a frequency error and a timing error are occurring between the transmitter and receiver.

38 Claims, 16 Drawing Sheets

MODULATOR, DEMODULATOR, AND TRANSMISSION SYSTEM FOR USE IN OFDM TRANSMISSION

BACKGROUND OF THE INVENTION

1. Field of the Invention

The present invention relates to a modulator and a demodulator used in Orthogonal Frequency Division Multiplex (hereinafter referred to as OFDM) transmission, and more particularly to a phase correcting technique.

2. Description of the Background Art

Recently, a transmission system using the OFDM technique is attracting attention in digital audio broadcasting for mobile devices and terrestrial digital television broadcasting. The OFDM technique is a kind of multi-carrier modulation system, in which data to be transmitted (transmitted data) is assigned to a large number of subcarriers so arranged that adjacent subcarriers are orthogonal to each other and converted into a digital modulated signal in the time domain by inverse Fourier transform to generate an OFDM signal. In the OFDM transmission, the OFDM signal generated by applying the above-described processing to the transmitted data on the transmitting end is transmitted to the receiving end. The receiving end applies the reverse process to that applied on the transmitting end to the transmitted OFDM signal to reproduce the transmitted data. Since each data divided onto the subcarriers has a longer period, the OFDM signal is not susceptible to effects of delayed waves such as multipath.

The OFDM demodulation is achieved by applying Fourier transform by using a fast Fourier transform (hereinafter referred to as FFT) circuit to the OFDM signal down converted to the baseband in a quadrature detector circuit. At this time, in the quadrature detector circuit, frequency synchronization must be accurately established between the transmitter and receiver, and in FFT, one symbol section must correctly be taken in from the received OFDM signal with a given clock, to obtain the phase and amplitude information of the subcarriers through the Fourier transform.

When a frequency error occurs in the OFDM signal on the transmitting and receiving ends, or when a timing error occurs and one symbol section cannot accurately be captured, the subcarriers suffer phase rotation and then the transmitted data cannot be reproduced. In this way, the OFDM demodulation requires accurate frequency synchronization, symbol synchronization, and clock synchronization, and a conventional OFDM demodulator must establish the frequency synchronization, symbol synchronization, and clock synchronization by using synchronizing symbols. Accordingly, as shown in FIG. 11, in the OFDM signal So, a transmission frame is composed of a plurality of OFDM symbols OS each including a plurality of ( . . . , k, k+1, k+2, . . . ) subcarriers SC, which is transmitted with a synchronizing symbol inserted in each frame. In the drawing, the vertical axis shows the phase $\phi$ and the horizontal axis shows the subcarrier frequency F. The character $\Delta \phi$ denotes a phase error between adjacent subcarrier.

As shown in FIG. 12, a null symbol is inserted as the synchronizing symbol RS in the beginning of n (n is an integer of one or larger) OFDM symbols OS to form one transmission frame Fr, and the null symbols are successively detected to establish synchronization. A signal from which synchronizing information can easily be obtained can be used as the null symbol, and it does not necessarily have to be an OFDM modulated signal. That is to say, since the OFDM signal So presents a waveform like random noise, it is difficult to obtain the synchronizing information directly from the time-domain waveform. Accordingly, a sine-waveform signal can be used for the frequency synchronization, and a waveform signal modulated by an amplitude shift keying (ASK) scheme, from which clock components can be easily extracted, can be used for the clock synchronization.

Referring to FIG. 13, the concept of the OFDM signal thus structured will be described. The left half of the diagram schematically shows the state SF of the OFDM signal in the frequency domain and the right half shows the state ST in the time domain. In the frequency-domain signal SF, a large number of subcarriers SC are orthogonally arranged on the frequency axis F in each OFDM symbol OS1 to OSn. This frequency-domain signal SF is subjected to inverse Fourier transform and OFDM modulation to generate the time-domain signal ST. The subcarriers SC are arranged at intervals P=1/PS (Hz) primarily modulated on the transmitting end, which are transformed by inverse Fourier transform to the signal ST having the symbol periods PS (sec) on the time axis T.

The transmitting end forms an OFDM signal transmission frame with the OFDM symbols OS and synchronization reference symbol RS and sends the frame. The synchronization reference symbol RS does not necessarily have to be an OFDM modulated symbol, but may be a signal having a waveform easy to use in synchronizing processing.

On the receiving end, only the synchronization reference symbol RS is taken out from the input signal ST on the time axis for synchronizing control. The OFDM symbols OS are cut out for each symbol period PS and converted by Fourier transform into the signal SF on the frequency axis, and thus the OFDM symbol OS is separated into the subcarriers SC. Subsequently, primary demodulation (data demodulation) is applied to the separated subcarriers to obtain the received data or to reproduce the transmitted data. In order to accurately maintain the synchronization in such OFDM signal demodulating process, the synchronization reference symbols must be transmitted periodically.

Referring to FIG. 14, the OFDM demodulator disclosed in Japanese Patent Laying-Open No. 8-102769 will now be described as an example of such a conventional OFDM demodulator. The OFDM demodulator DMC includes an A/D converter 101, a clock synchronization establishing portion 102, a quadrature detector 103, a frequency synchronization establishing unit 104, a Fast Fourier Transform unit (FFT) 105, a symbol synchronization establishing unit 106, and a primary demodulator 107. The OFDM signal So' sent from the transmitter is supplied to the A/D converter 101, clock synchronization establishing unit 102, frequency synchronization establishing unit 104, and symbol synchronization establishing unit 106.

The clock synchronization establishing unit 102 detects a synchronization error in a sampling clock between the transmitter and receiver in the OFDM signal on the basis of the synchronizing symbols RS in the OFDM signal So'. The clock synchronization establishing unit 102 then corrects the detected synchronization error to generate a synchronized sampling clock signal Ssc and outputs the same to the A/D converter 101. The A/D converter 101 converts the analogue OFDM signal So' to a digital OFDM signal So synchronized in sampling clock component on the basis of the sampling clock signal Ssc and outputs the signal So to the quadrature detector 103.

The frequency synchronization establishing unit 104 detects a synchronization error in carrier signal frequency between the transmitter and receiver on the basis of the synchronizing symbol RS in the OFDM signal So' and generates and outputs a synchronized frequency signal Scf to the quadrature detector 103. The quadrature detector 103 subjects the OFDM symbol OS (subcarriers SC) to quadrature detection in the digital OFDM signal So synchronized in sampling clock component on the basis of the frequency signal Scf, converts it from the intermediate frequency band into the OFDM signal Sb in the baseband, and outputs the signal Sb to the fast Fourier transform unit 105. Needless to say, the OFDM signal Sb in the baseband is synchronized in carrier signal frequency component and also synchronized in sampling clock component.

The symbol synchronization establishing unit 106 detects a synchronization error in symbol time window between the transmitter and receiver on the basis of the synchronizing symbol RS in the OFDM signal So' to generate a synchronized symbol time window signal Sst and outputs the signal Sst to the fast Fourier transform unit 105. The fast Fourier transform unit 105 applies fast Fourier transform to the OFDM signal Sb in the baseband on the basis of the symbol time window signal Sst. The fast Fourier transform unit 105 separates the signal in the time domain to the subcarriers SC in the frequency domain for each OFDM symbol OS to generate a symbol synchronized subcarrier signal Sc and outputs the signal Sc to the primary demodulator 107. This subcarrier signal Sc is synchronized in symbol window and also synchronized in sampling clock and carrier signal frequency.

The primary demodulator 107 demodulates the subcarrier signal Sc outputted from the fast Fourier transform unit 105 for each subcarrier to reproduce the transmitted data Sd.

The conventional OFDM demodulator DMC applies Fourier transform by using the fast Fourier transform (FFT) unit 105 to the OFDM signal Sb down converted to the baseband by the quadrature detector circuit 103. At this time, the quadrature detector circuit 103 requires accurate frequency synchronization between transmitter and receiver, and the FFT accurately captures one symbol section from the received OFDM signal with a defined clock to obtain the phase and amplitude information of the subcarriers by Fourier transform.

In the data processing in the OFDM demodulator, the same conditions as those in the transmitter must be correctly reproduced about the sampling clock, carrier frequency, and FFT symbol window time. That is to say, in OFDM demodulation, synchronization must be established about the sampling clock, carrier frequency, and symbol time window. The conventional OFDM demodulator establishes the symbol synchronization and clock synchronization by detecting the synchronizing symbols intermittently inserted at certain intervals. In this case, the synchronizing symbols for several frames must be detected before establishing synchronization, and the OFDM symbols in this period cannot be correctly demodulated. However, the synchronization errors between the transmitter and receiver easily occur due to variations in the transmission environment and the like, which cause clock error, frequency error, and time window error. When such errors are occurring, the carriers of the OFDM modulated symbols suffer phase rotation of a amount corresponding to the errors with respect to the phases given at the time of transmission. Since information (transmitted data) are assigned to phases of the subcarriers, the transmitted data will be erroneously reproduced.

For these errors, the information is detected from the synchronization reference symbols, and the sampling clock error, carrier frequency error, and symbol time window error are fed back as the respective error signals to make adjustments for synchronization (to establish synchronization). Hence, since the subcarriers of OFDM symbols demodulated when the errors are occurring have phase rotation errors, the transmitted data are erroneously reproduced. Further, when the synchronizing symbols cannot be continuously detected at given intervals, stable synchronization cannot be established, and then it is very difficult to correctly demodulate the OFDM symbols transmitted in a burst manner.

SUMMARY OF THE INVENTION

Accordingly, the present invention has been made to solve the problems described above, and an object of the present invention is to provide a modulator and a demodulator for use in OFDM transmission which can correct phase errors of subcarriers to enable demodulation of OFDM symbols even when frequency error and timing error are occurring between the transmitter and receiver.

To achieve the object above, the present invention has the following features.

A first aspect of the present invention is directed to an OFDM demodulator receiving, as an input, an OFDM signal in which known pilot carriers as a phase reference are assigned to a plurality of given subcarriers among subcarriers used in transmission the demodulator comprises: a Fourier transform portion for separating the OFDM signal into the subcarriers by Fourier transform to generate a first subcarrier signal; a carrier phase error detecting portion for obtaining an amount of phase correction for each subcarrier in the first subcarrier signal on the basis of the pilot carrier in the first subcarrier signal; and a phase correcting portion for correcting a phase of the first subcarrier signal on the basis of the amounts of phase correction to generate a second subcarrier signal.

According to the first aspect described above, the amounts of phase correction to subcarriers in a Fourier transformed OFDM signal are obtained on the basis of pilot carriers having a reference phase and assigned to given subcarriers, and phase errors due to a synchronization error can be quickly corrected on the basis of the amounts of phase correction. Accordingly, when a plurality of OFDM symbols are transmitted in a burst manner, the individual OFDM symbols can be correctly demodulated.

According to a second aspect of the invention which depends on the first aspect, the carrier phase error detecting portion comprises: a pilot carrier location detecting portion for detecting location of the pilot carrier in the first subcarrier signal to generate a pilot carrier location signal; a pilot carrier extracting portion for extracting a first pilot carrier from the first subcarrier signal on the basis of the pilot carrier location signal; and a pilot carrier memory for holding the known pilot carriers and reading a second pilot carrier corresponding to the detected location among the held known pilot carriers on the basis of the pilot carrier location signal. The carrier phase error detecting portion further comprises: a phase difference calculating portion for calculating a phase difference between the first and second pilot carriers to generate a phase difference signal indicating the phase difference; a phase change amount calculating portion for calculating an amount of change of phase rotation between transmitting and receiving ends with respect to carrier frequency on the basis of the phase difference signal and generating an amount of phase difference change between transmitter-receiver signal indicating the amount of change; and a phase correction amount calculating portion for calculating an amount of phase correction for each subcarrier on the basis of the phase difference signal and the amount of phase difference change between transmitter-receiver signal and generating a phase error correcting signal.

According to the second aspect above, a phase difference of a pilot carrier between the transmitter and receiver is calculated and an amount of change of phase rotation between the transmitter and receiver with respect to the carrier frequency is then calculated, on the basis of which amounts of phase correction to the subcarriers are calculated. Hence, the amounts of phase correction correspond to the absolute phase errors of the subcarriers (the phase errors between the transmitter and receiver). Accordingly, with an OFDM signal in which the subcarriers are modulated by an absolute phase modulation, such as QPSK or QAM, the phase errors can be corrected so that the subcarriers can be correctly demodulated.

According to a third aspect of the invention which depends on the second aspect, the OFDM demodulator further comprises a data demodulating portion for demodulating the second subcarrier signal to reproduce transmitted data.

According to a fourth aspect of the invention which depends on the first aspect, the subcarriers in the OFDM signal to be inputted are subjected to differential modulation between the subcarriers adjacent in the frequency direction with reference to the pilot carriers. The carrier phase error detecting portion comprises: a pilot carrier extracting portion for extracting a pilot carrier from the first subcarrier signal; a phase calculating portion for calculating a phase of the pilot carrier on the basis of the extracted pilot carrier; a phase change amount calculating portion for calculating the amount of phase change from the calculated phase of the pilot carrier; and a phase correction amount calculating portion for calculating an amount of phase correction between the subcarriers on the basis of the calculated amount of phase change, wherein the phase correcting portion corrects the phase of the first subcarrier signal on the basis of the calculated amount of phase correction.

According to the fourth aspect above, an amount of phase correction between the subcarriers is obtained on the basis of the phase of the received pilot carrier, but the phase difference of the pilot carrier between the transmitter and receiver is not obtained. Accordingly, with an OFDM signal in which the subcarriers are subjected to differential modulation in the frequency direction, errors in phase difference between the subcarriers can be corrected with a simple structure to correctly demodulate the data.

According to a fifth aspect of the invention which depends on the fourth aspect, the OFDM demodulator further comprises a differential demodulation portion for reproducing transmitted data by subjecting the second subcarrier signal to differential demodulation.

According to a sixth aspect of the invention which depends on the fourth aspect, the OFDM demodulator further comprises an inter-carrier phase difference calculating portion for calculating a phase difference between the adjacent subcarriers on the basis of the first subcarrier signal, and the phase correcting portion corrects the phase difference indicated by an output of the inter-carrier phase difference calculating portion on the basis of the calculated amount of phase correction.

According to a seventh aspect of the invention which depends on the second aspect, the phase difference calculating portion obtains the phase difference between the first and second pilot carriers by receiving first and second complex numbers representing the first and second pilot carriers as inputs, multiplying the first complex number and conjugate complex number of the second complex number to obtain a third complex number, and calculating an arc tangent arctan (q/i) from real part i and imaginary part q of the third complex number.

According to an eighth aspect of the invention which depends on the second aspect, the phase difference calculating portion obtains the phase difference between the first and second pilot carriers by receiving first and second complex numbers representing the first and second pilot carriers as inputs, obtaining their phases $\Theta_A$ and $\Theta_B$ by an arc tangent arctan calculation, and calculating $\Theta_A$ $\Theta_B$.

According to a ninth aspect of the invention which depends on the fourth aspect, the phase calculating portion obtains the phase of the extracted pilot carrier by calculating arc tangent arctan (q/i) from real part i and imaginary part q of a complex number representing the extracted pilot carrier.

According to a tenth aspect of the invention which depends on the fourth aspect, the phase calculating portion obtains an approximate value of the phase of the extracted pilot carrier by calculating q/i from real part i and imaginary part q of a complex number representing the extracted pilot carrier.

According to an eleventh aspect of the invention which depends on the second or fourth aspect, the phase change amount calculating portion obtains the amount of phase change with respect to the carrier frequency by estimating phase changes of other subcarriers from the phase of an arbitrary pilot carrier among the phases of the pilot carriers existing for each given carrier frequency.

According to a twelfth aspect of the invention which depends on the eleventh aspect, the phase change amount calculating portion obtains the amount of phase change with respect to the carrier frequency by interpolating the phase changes of other subcarriers from the phases of at least two pilot carriers among the phases of the pilot carriers existing for each given carrier frequency.

According to a thirteenth aspect of the invention which depends on the eleventh aspect, the phase change amount calculating portion obtains the amount of phase change with respect to the carrier frequency from a slope of a line obtained by linearly approximating the phase changes of other subcarriers from the phases of at least two pilot carriers among the phases of the pilot carriers existing for each given carrier frequency.

According to a fourteenth aspect of the invention which depends on the eleventh aspect, the phase change amount calculating portion obtains the amount of phase change with respect to the carrier frequency by dividing a phase difference between the phases of two pilot carriers among the phases of the pilot carriers existing for each given carrier frequencies by a difference in carrier frequency between the two pilot carriers.

According to a fifteenth aspect of the invention which depends on the eleventh aspect, the phase change amount calculating portion obtains the amount of phase change with respect to the carrier frequency by performing the calculation of dividing a phase difference between two pilot carriers among the phases of the pilot carriers existing for each given carrier frequencies by a frequency difference between the two pilot carriers a plurality of times for different pairs of the pilot carriers to obtain a plurality of division results within an OFDM symbol, and then averaging the plurality of division results.

According to a sixteenth aspect of the invention which depends on the first aspect, the pilot carriers in the OFDM signal are assigned to the subcarriers at constant frequency intervals.

According to a seventeenth aspect of the invention which depends on the first aspect, the pilot carriers in the OFDM signal are assigned to the subcarriers at frequency intervals increasing by given increments.

According to an eighteenth aspect of the invention which depends on the first aspect, the pilot carriers in the OFDM signal are assigned to the subcarriers at frequency intervals defined by a given PN sequence.

According to a nineteenth aspect of the invention which depends on the first aspect, the OFDM signal is continuously inputted.

According to a twentieth aspect of the invention which depends on the first aspect, the OFDM signal is inputted in a burst manner.

According to a twenty-first aspect of the invention which depends on the fourth aspect, a multi-valued differential phase shift keying is used as the differential modulation.

According to a twenty-second aspect of the invention which depends on the fourth aspect, a multi-valued differential amplitude and phase shift keying is used as the differential modulation.

A twenty-third aspect of the invention is directed to an OFDM demodulation method for demodulating an OFDM signal in which known pilot carriers as a phase reference are assigned to a plurality of given subcarriers among subcarriers used in transmission. The method comprises: a Fourier transform step of separating the OFDM signal into the subcarriers by Fourier transform to generate a first subcarrier signal; a carrier phase error detecting step of obtaining an amount of phase correction for each subcarrier in the first subcarrier signal on the basis of the pilot carrier in the first subcarrier signal; and a phase correcting step of correcting a phase of the first subcarrier signal on the basis of the amounts of phase correction to generate a second subcarrier signal.

According to a twenty-fourth aspect of the invention which depends on the twenty-third aspect, the carrier phase error detecting step comprises the steps of: detecting location of the pilot carrier in the first subcarrier signal to generate a pilot carrier location signal; extracting a first pilot carrier from the first subcarrier signal on the basis of the pilot carrier location signal; and holding the known pilot carriers and reading a second pilot carrier corresponding to the detected location among the held known pilot carriers on the basis of the pilot carrier location signal. The carrier phase error detecting step further comprises calculating a phase difference between the first and second pilot carriers to generate a phase difference signal; calculating an amount of phase change on the basis of the phase difference signal and generating an amount of phase difference change between transmitter-receiver signal; and calculating an amount of phase correction for each subcarrier on the basis of the phase difference signal and the amount of phase difference change between transmitter-receiver signal and generating a phase error correcting signal.

According to a twenty-fifth aspect of the invention which depends on the twenty-third aspect, the subcarriers in the OFDM signal to be inputted are subjected to differential modulation between the subcarriers adjacent in frequency direction with reference to the pilot carriers. The carrier phase error detecting step comprises the steps of: extracting a pilot carrier from the first subcarrier signal; calculating phase of the pilot carrier on the basis of the extracted pilot carrier; calculating an amount of phase change from the calculated phase of the pilot carrier; and calculating an amount of phase correction between the subcarriers on the basis of the calculiated amount of phase change, wherein the phase correcting step corrects the phase of the first subcarrier signal on the basis of the calculated amount of phase correction.

According to a twenty-sixth aspect of the invention which depends on the twenty-fifth aspect, the OFDM demodulation method further comprises an inter-carrier phase difference calculating step of calculating a phase difference between the adjacent subcarriers on the basis of the first subcarrier signal, and the phase correcting step corrects the phase difference between adjacent subcarriers calculated in the inter-carrier phase difference calculating step on the basis of the calculated amount of phase correction.

A twenty-seventh aspect of the invention is directed to an OFDM transmission system for transmitting an orthogonal frequency division multiplexed signal generated from a plurality of subcarriers modulated with transmitted data for each given-length symbol from a transmitting end to a receiving end through a wired or radio transmission path. The transmitting end comprises an OFDM modulator comprising: a data modulation portion for assigning known pilot carriers as a phase reference to a plurality of given subcarriers among transmission subcarriers used in the transmission of the orthogonal frequency division multiplexed signal and modulating data carriers which are the subcarriers other than the pilot carriers among the transmission subcarriers with the transmitted data; and an OFDM signal generating portion for generating the orthogonal frequency division multiplexed signal from the transmission subcarriers including the pilot carriers and the data carriers after modulation.

The receiving end comprises an OFDM demodulator comprising: a subcarrier separating portion for separating the subcarriers from the orthogonal frequency division multiplexed signal and outputting the subcarriers as received subcarriers; a phase error calculating portion for calculating an amount of phase correction for each received subcarrier on the basis of the pilot carrier included in the received subcarriers; and a phase correcting portion for correcting the phases of the received subcarriers in accordance with the amounts of phase correction.

According to a twenty-eighth aspect of the invention which depends on the twenty-seventh aspect, the orthogonal frequency division multiplexed signal is a burst-type signal composed of a plurality of symbols.

A twenty-ninth aspect of the invention is directed to an OFDM transmission system for transmitting an orthogonal frequency division multiplexed signal generated from a plurality of subcarriers modulated with transmitted data for each given-length symbol from a transmitting end to a receiving end through a wired or radio transmission path.

The transmitting end comprises an OFDM modulator comprising: a differential modulation portion for assigning known pilot carriers as a phase reference to a plurality of given subcarriers among transmission subcarriers used in the transmission of the orthogonal frequency division multiplexed signal and subjecting the transmission subcarriers to differential modulation between subcarriers adjacent in frequency direction with the transmitted data with reference to the pilot carriers; and an OFDM signal generating portion for generating the orthogonal frequency division multiplexed signal from the transmission subcarriers after the differential modulation.

The receiving end comprises an OFDM demodulator comprising: a subcarrier separating portion for separating the subcarriers from the orthogonal frequency division multiplexed signal and outputting the subcarriers as received subcarriers; a phase error calculating portion for calculating an amount of phase correction for each subcarrier on the basis of the pilot carrier included in the received subcarriers; a phase correcting portion for correcting the phases of the received subcarriers in accordance with the amounts of phase correction; and a differential demodulation portion for subjecting the received subcarriers after the phase correction by the phase correcting portion to differential demodulation with reference to the pilot carriers to reproduce the transmitted data.

According to a thirtieth aspect of the invention which depends on the twenty-ninth aspect, the orthogonal frequency division multiplexed signal is a burst-type signal composed of a plurality of symbols.

A thirty-first aspect of the invention is directed to an OFDM transmission system for transmitting an orthogonal frequency division multiplexed signal generated from a plurality of subcarriers modulated with transmitted data for each given-length symbol from a transmitting end to a receiving end through a wired or radio transmission path.

The transmitting end comprises an OFDM modulator comprising: a differential modulation portion for assigning known pilot carriers as a phase reference to a plurality of given subcarriers among transmission subcarriers used in the transmission of the orthogonal frequency division multiplexed signal and subjecting the transmission subcarriers to differential modulation between subcarriers adjacent in the frequency direction with the transmitted data with reference to the pilot carriers; and an OFDM signal generating portion for generating the orthogonal frequency division multiplexed signal from the transmission subcarriers after the differential modulation.

The receiving end comprises an OFDM demodulator comprising: a subcarrier separating portion for separating the subcarriers from the orthogonal frequency division multiplexed signal and outputting the subcarriers as received subcarriers; an inter-carrier phase difference calculating portion for calculating a phase difference between the subcarriers adjacent in the frequency direction among the received subcarriers; a phase error calculating portion for calculating an amount of phase difference correction which is an amount of correction to the phase difference between the adjacent subcarriers on the basis of the pilot carrier included in the received subcarriers; and a phase correcting portion for correcting the phase difference between the adjacent subcarriers in accordance with the amount of phase difference correction.

According to a thirty-second aspect of the invention which depends on the thirty-first aspect, the orthogonal frequency division multiplexed signal is a burst-type signal composed of a plurality of symbols.

A thirty-third aspect of the invention is directed to an OFDM modulator for transmitting an orthogonal frequency division multiplexed signal generated from a plurality of subcarriers modulated with transmitted data for each given-length symbol. The OFDM modulator comprises: a data modulation portion for assigning known pilot carriers as a phase reference to a plurality of given subcarriers among transmission subcarriers used in the transmission of the orthogonal frequency division multiplexed signal and modulating the transmission subcarriers with the transmitted data; and an OFDM signal generating portion for generating the orthogonal frequency division multiplexed signal from the transmission subcarriers after being modulated by the data modulation portion.

According to a thirty-fourth aspect of the invention which depends on the thirty-third aspect, the data modulation portion modulates data carriers which are the subcarriers other than the pilot carriers among the transmission subcarriers with the transmitted data.

According to a thirty-fifth aspect of the invention which depends on the thirty-third aspect, the data modulation portion subjects the transmission subcarriers to differential modulation between subcarriers adjacent in the frequency direction with the transmitted data with reference to the pilot carriers.

According to a thirty-sixth aspect of the invention which depends on the thirty-third aspect, the data modulation portion assigns the pilot carriers to the transmission subcarriers at constant frequency intervals.

According to a thirty-seventh aspect of the invention which depends on the thirty-third aspect, the data modulation portion assigns the pilot carriers to the transmission subcarriers at frequency intervals increasing in given increments.

According to a thirty-eighth aspect of the invention which depends on the thirty-third aspect, the data modulation portion assigns the pilot carriers to the transmission subcarriers at frequency intervals defined by a given PN sequence.

According to a thirty-ninth aspect of the invention which depends on the thirty-third aspect, the OFDM signal generating portion generates a continuous signal composed of a plurality of symbols as the orthogonal frequency division multiplexed signal.

According to a fortieth aspect of the invention which depends on the thirty-third aspect, the OFDM signal generating portion generates a burst-type signal composed of a plurality of symbols as the orthogonal frequency division multiplexed signal.

According to a forty-first aspect of the invention which depends on the thirty-fifth aspect, the data modulation portion performs a multi-valued differential phase shift keying as the differential modulation.

According to a forty-second aspect of the invention which depends on the thirty-fifth aspect, the data modulation portion performs a multi-valued differential amplitude and phase shift keying as the differential modulation.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
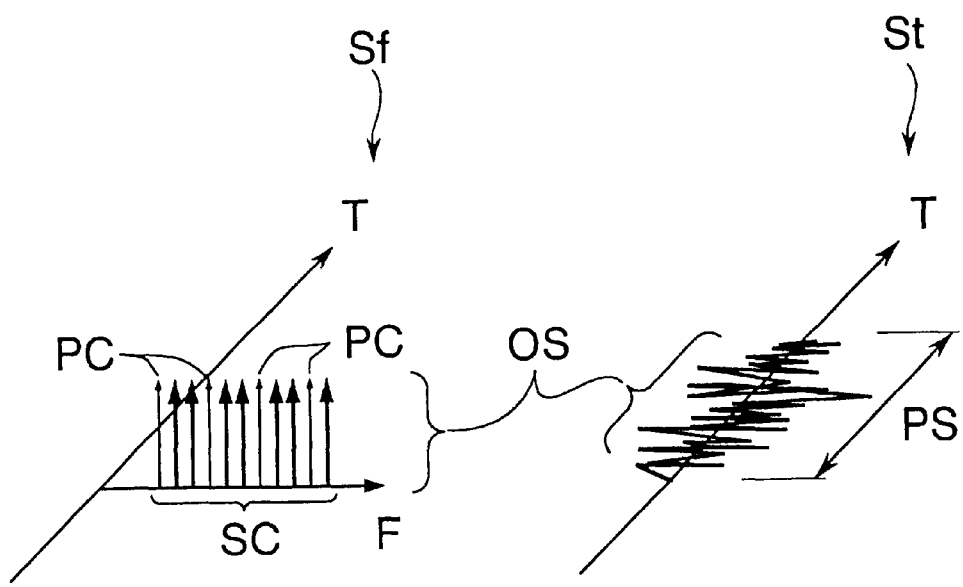
FIG. 2 is a diagram used to explain the basic idea of an OFDM signal of the invention and its modulation and demodulation.

First, an OFDM signal of the present invention and the basic concept of its modulation and demodulation will be described referring to FIG. 2. In the diagram, the left half schematically shows a state Sf of a OFDM signal in a frequency domain and the right half shows a state St in a time domain. The frequency-domain signal Sf is composed of a large number of subcarriers orthogonally arranged on a frequency axis F, among which subcarriers with a known phase called pilot carriers PC are interposed. That is to say, among the plurality of subcarriers SC in each OFDM symbol OS, the subcarriers SC at given intervals are provided in a known phase and the known-phase subcarriers SC serve as the pilot carriers PC. As shown in FIG. 2, the OFDM signal So of the present invention does not need the synchronizing symbol RS.

Figure 15:
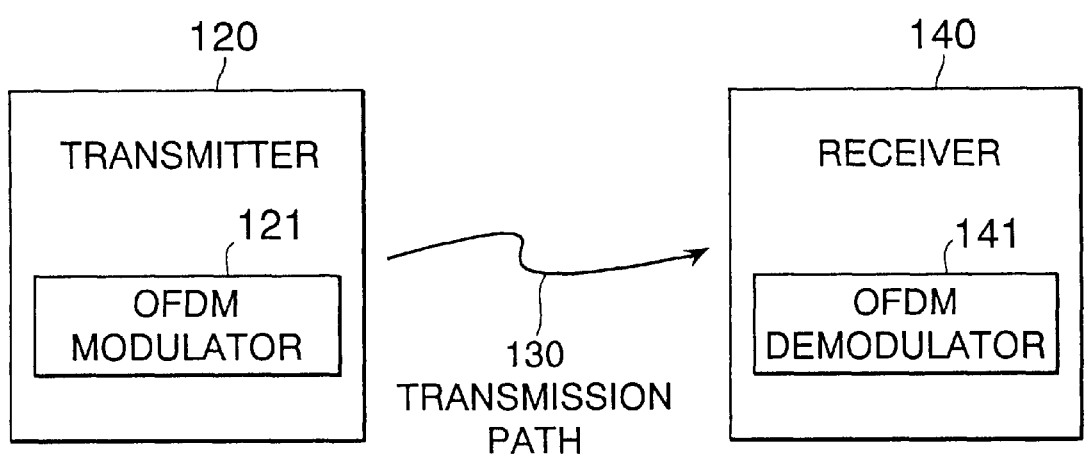
FIG. 15 is a diagram showing a transmission system using the OFDM signal.

As shown in FIG. 15, on the transmitting end in a data transmission system using the OFDM signal, an OFDM modulator 121 contained in a transmitter 120 generates the OFDM signal as described below. First, the subcarriers SC used for transmission are generated by assigning data to be transmitted (transmitted data) to a plurality of subcarriers and inserting the pilot carriers PC between the subcarriers. Next, inverse Fourier transform is applied to the subcarriers SC including the pilot carriers for each symbol period to generate a time-domain signal St. This time-domain signal St is modulated and then transmitted from the transmitter 120 to a receiver 140 as an OFDM signal So' through a transmission path 130. The receiving end receives the OFDM signal So and an OFDM demodulator 141 in the receiver 140 obtains the received data from the OFDM signal So as described below. First, the OFDM signal So', is demodulated to obtain the time-domain signal St as a baseband signal. Next, the time-domain signal St is cut out for each symbol period PS and the cut out time-domain signal St is separated into the subcarriers SC on the frequency axis F by applying Fourier transform. After separation, phase rotation errors in that OFDM symbol are estimated from the phases of the pilot carriers PC to compensate for the phase errors of the subcarriers SC. The received data is obtained by obtaining the phases and amplitudes of the subcarriers whose phase errors were compensated for.

As stated above, in the present invention, the phase errors due to a synchronization error are corrected, so that the individual OFDM symbols OS can be correctly demodulated when a plurality of OFDM symbols OS are transmitted in a burst manner.

Further, since the phase errors due to the synchronization error can be compensated for on the basis of the pilot carriers PC buried in the OFDM symbols OS, the data can be precisely demodulated even when the detecting accuracy of the synchronization detecting portion is inferior or when the device does not have a synchronization detecting portion.

Figure 12:
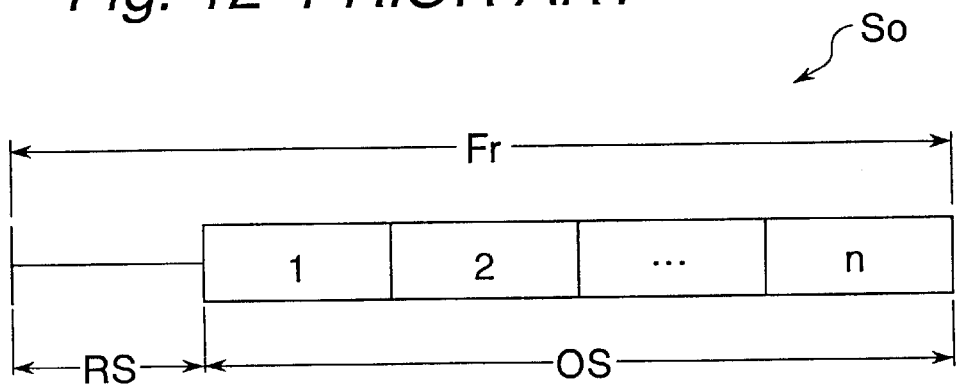
FIG. 12 is an explanation diagram showing an OFDM transmission frame of a conventional example.
Figure 13:
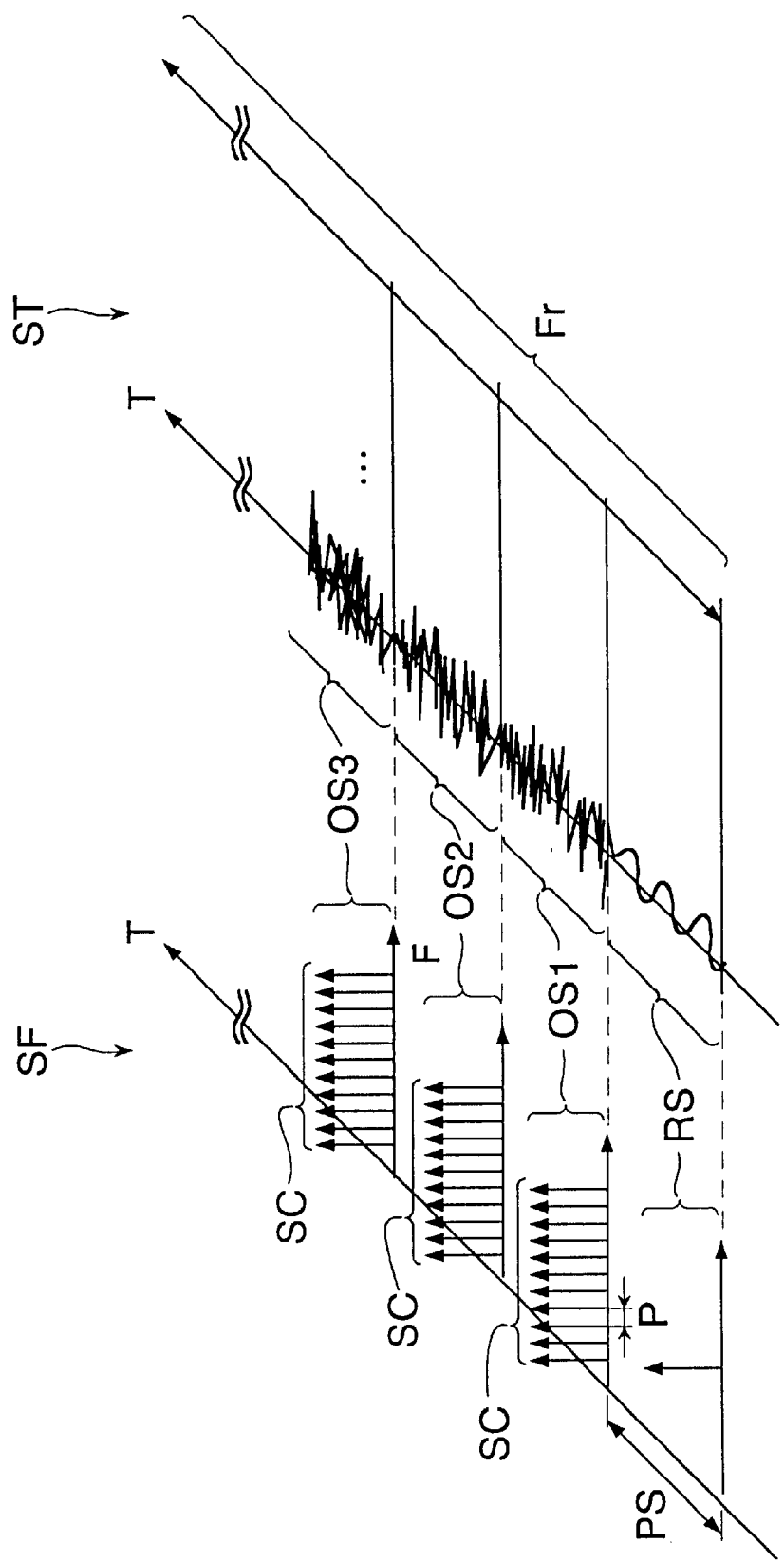
FIG. 13 is an explanation diagram showing the states of the conventional OFDM signal in the frequency domain and time domain.

Further, the present invention can also be applied to a system in which the OFDM signal is transmitted in frames, like the conventional OFDM signal having the frame structure shown in FIG. 12 and FIG. 13. That is to say, the synchronization error can be corrected for each symbol with the pilot carriers PC buried in the symbols forming the frame, and therefore, the synchronization can also be accurately obtained when the OFDM symbols are continuously inputted.

As will be fully described later, the accuracy of demodulation can be further improved by establishing synchronization to a certain extent on the basis of the synchronization reference symbols RS and then applying phase compensation to errors that cannot be corrected by the synchronization establishing portion. The fact that the present invention can also be applied to the conventional OFDM signal containing the synchronizing symbols RS will be fully described later referring to FIG. 9.

Figure 3:
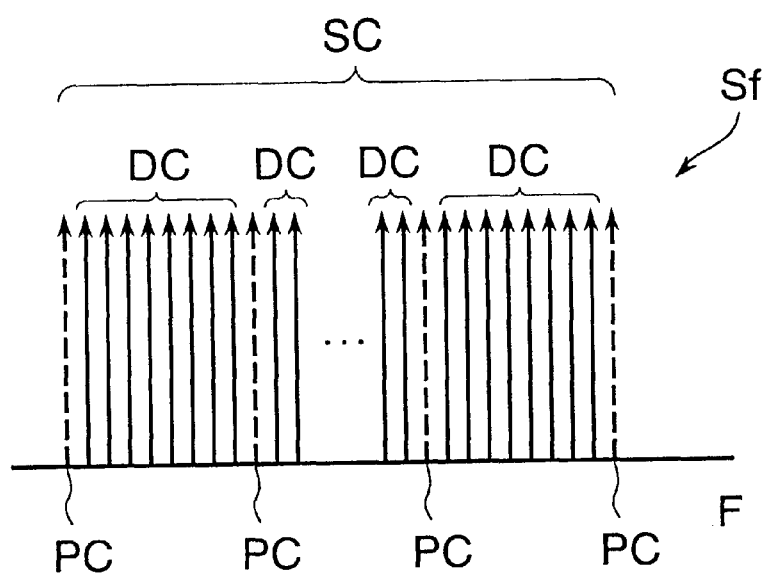
FIG. 3 is a diagram used to explain the detailed structure of subcarriers in the OFDM frequency-domain signal shown in FIG. 2.

Referring to FIG. 3, the subcarriers SC in the OFDM frequency-domain signal Sf shown in FIG. 2 will be described in greater detail. Among the large number of subcarriers SC arranged on the frequency axis F, given complex numbers as a reference phase are assigned to given subcarriers, which serve as the pilot carriers PC (shown by the dotted-arrows). The complex number assigned to the pilot carrier PC is (1, 0), for example. Note that a complex number composed of real part i and imaginary part q is represented as "(i, q)."The pilot carriers PC are assigned to subcarriers SC at constant frequency intervals, for example. The pilot carriers PC may be assigned to subcarriers SC at such frequency intervals that the number of subcarriers SC interposed between the pilot carriers PC (i.e., the subcarrier intervals) increases in constant increments, as 1, 3, 5, . . . . Further, the pilot carriers PC may be assigned to the subcarriers at frequency intervals defined by a given PN sequence. Thus, the present invention can correctly demodulate an OFDM signal in which the pilot carriers PC are assigned to subcarriers at constant frequency intervals, an OFDM signal in which the pilot carriers PC are assigned to subcarriers at frequency intervals increasing by given increments, and an OFDM signal in which the pilot carriers PC are assigned to subcarriers at frequency intervals defined by a given PN sequence.

Transmitted data are assigned to the subcarriers SC other than the pilot carriers PC, which are called data carriers DC. The transmitted data can be assigned to the data carriers DC by various modulation techniques such as QPSK and 16QAM. Differential modulation may be applied between adjacent data carriers DC, in which case DQPSK or DAPSK can be used, for example. Thus, multi-valued differential phase shift keying and multi-valued differential amplitude and phase shift keying can be used as the differential modulation.

The transmitting end performs OFDM modulation to the subcarriers SC thus structured by applying inverse Fourier transform and adds guard intervals to the OFDM signal transformed into the time-domain signal ST. The OFDM signal provided with the guard intervals is transmitted continuously or in a burst manner for each OFDM symbol.

OFDM Modulator

Now embodiments of OFDM modulators of the present invention will be described.

Figure 16:
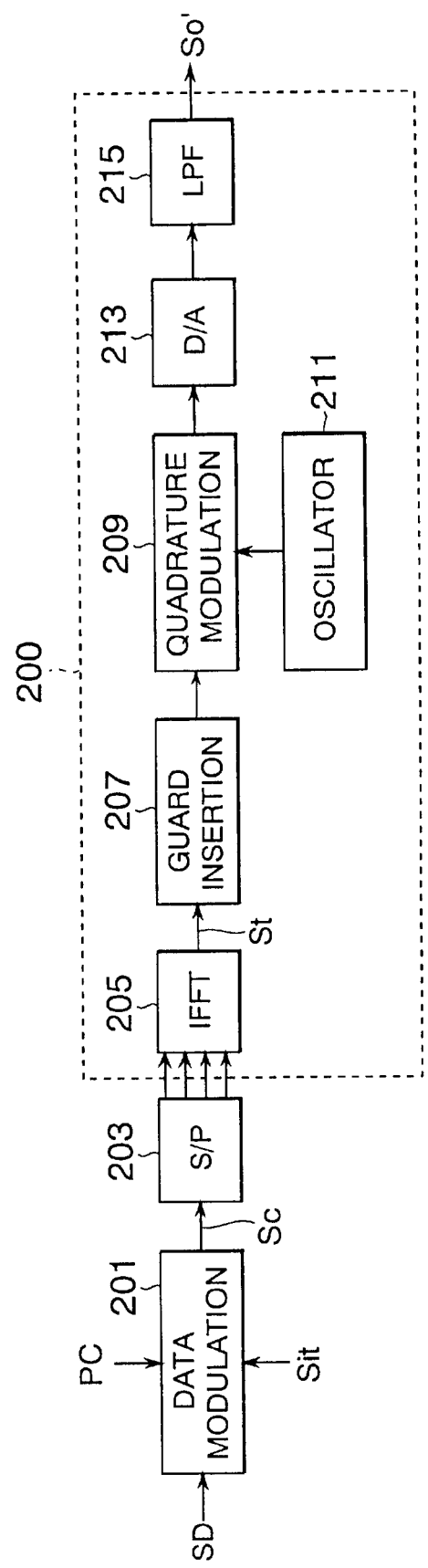
FIG. 16 is a block diagram showing the structure of an OFDM modulator of a first embodiment of the-present invention.

FIG. 16 is a block diagram showing the structure of an OFDM modulator according to a first embodiment of the present invention. The OFDM modulator of the first embodiment has a data modulating portion 201, a serial-parallel converting portion 203, and an OFDM signal generating portion 200. The OFDM signal generating portion 200 has an inverse Fourier transform portion 205, a guard inserting portion 207, a quadrature modulation portion 209, an oscillator 211, an D/A converter 213, and a low-pass filter 215. Transmitted data SD is inputted to the data modulating portion 201 in the OFDM modulator. The data modulating portion 201 divides the transmitted data SD into given blocks, converts the data in each block into one complex number (or vector) corresponding to phase and amplitude of the subcarrier, and assigns the complex number to the subcarrier (The subcarriers to which the complex numbers corresponding to the data in the respective blocks are assigned are referred to as "data carriers"). As well as the transmitted data SD, the data modulating portion 201 is also supplied with the pilot carriers PC to which known complex numbers corresponding to phase and amplitude are assigned and a timing signal Sit for insertion of the pilot carriers, and then inserts the pilot carriers PC between the data carriers on the basis of the timing signal Sit. The pilot carriers PC are thus interposed among the data carriers and the subcarriers used in transmission are obtained as transmission subcarriers SC on the frequency axis. The data corresponding to the phases and amplitudes of the transmission subcarriers SC on the frequency axis are converted into parallel data in the serial-parallel converting portion 203 in units of transmission subcarriers corresponding to one symbol period, and then inputted to the inverse Fourier transform portion 205. The inverse Fourier transform portion 205 converts the parallel data to the time-domain signal St by applying inverse Fourier transform. This time-domain signal St is supplied with guard intervals in the guard inserting portion 207 and then quadrature modulated in the quadrature modulation portion 209 by using a signal generated by the oscillator 211. The quadrature-modulated signal is converted into an analogue signal in the D/A converter 213 and then outputted from the OFDM modulator through the low-pass filter 215 as the OFDM signal So'.

Figure 17:
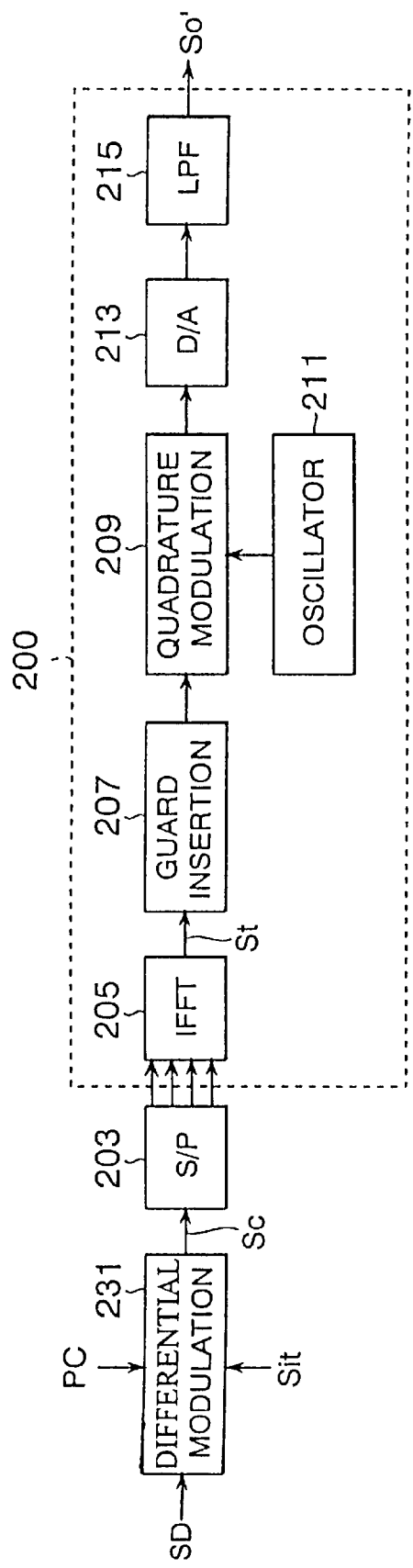
FIG. 17 is a block diagram showing the structure of an OFDM modulator of a second embodiment of the present invention.

FIG. 17 is a block diagram showing the structure of an OFDM modulator of a second embodiment of the present invention. The OFDM modulator of the second embodiment has a differential modulation portion 231, a serial-parallel converting portion 203, and an OFDM signal generating portion 200. The OFDM signal generating portion 200 has an inverse Fourier transform portion 205, a guard inserting portion 207, a quadrature modulation portion 209, an oscillator 211, an D/A converter 213, and a low-pass filter 215. In the second embodiment, the same components as those in the first embodiment are shown by the same reference numerals.

Figure 18:
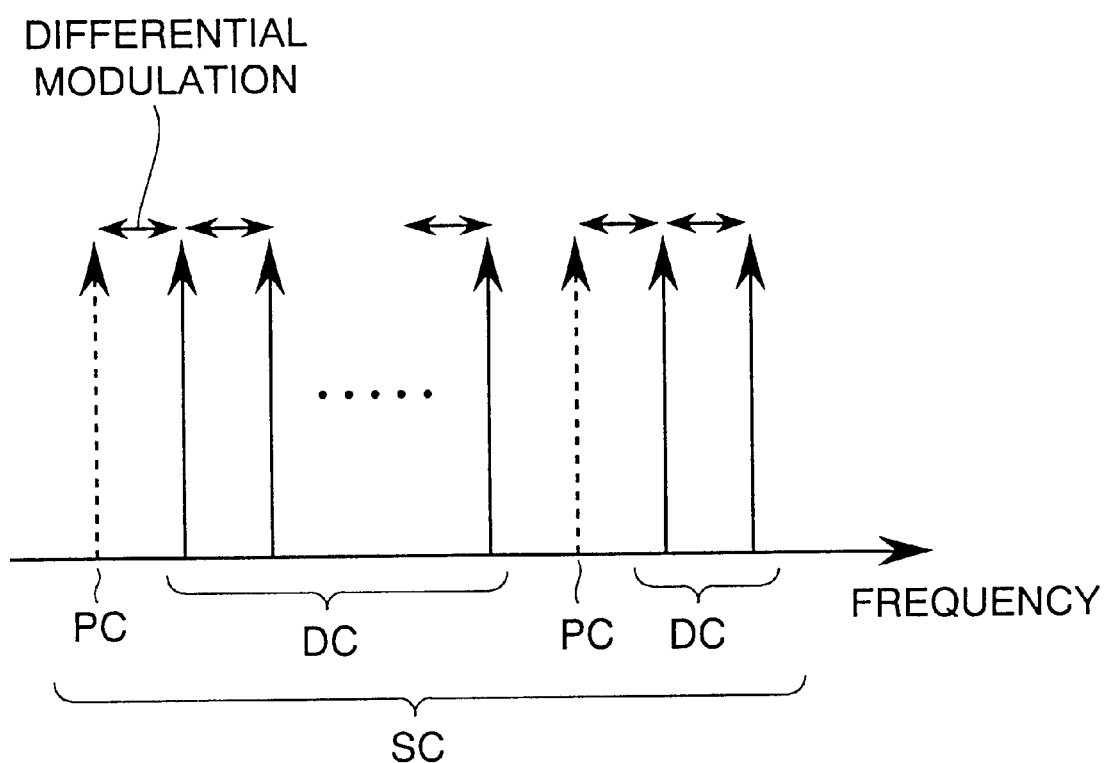
FIG. 18 is a diagram used to explain differential modulation in the OFDM modulator of the second embodiment of the present invention.

The transmitted data SD is inputted to the differential modulation portion 231 in the OFDM modulator. The differential modulation portion 231 divides the transmitted data SD into given blocks and carries out differential modulation by using the data in blocks as follows. That is to say, as shown in FIG. 18, the differential modulation portion 231 carries out differential modulation between subcarriers adjacent in a frequency direction on the basis of the pilot carriers described later. When differential phase shift keying is used as the differential modulation, the differential modulation portion 231 places the data in each block forming the transmitted data SD on the phase difference between subcarriers adjacent in the frequency direction (the subcarriers to which the data in blocks are assigned are referred to as "data carriers" also in this embodiment.) In addition to the transmitted data, the differential modulation portion 231 also receives the pilot carriers PC to which known complex numbers corresponding to phase and amplitude are assigned and a timing signal Sit corresponding to insertion of the pilot carriers, and then inserts the pilot carriers PC among the data carriers on the basis of the timing signal Sit. When differential modulation is used as in this embodiment, the known complex numbers are assigned so that the phases of the inserted pilot carriers PC are identical. The pilot carriers PC are thus buried between the data carriers and the subcarriers used in transmission are obtained as transmission subcarriers SC on the frequency axis. The data corresponding to the phases and amplitudes of the transmission subcarriers SC on the frequency axis is converted into parallel data in the serial parallel converting portion 203 in units of transmission subcarriers corresponding to one symbol period and then inputted to the inverse Fourier transform portion 205. Subsequently, similar to the first embodiment, an OFDM signal So' is generated through the inverse Fourier transform portion 205, guard inserting portion 207, quadrature modulation portion 209, oscillator 211, D/A converter 213, and low-pass filter 215.

According to the second embodiment above, unlike a conventional differential modulation applied between adjacent symbols, the differential modulation is applied between subcarriers adjacent in the frequency direction, so that the modulation and demodulation can efficiently be performed even with a burst-like OFDM signal constructed so that masses of data intermittently appear, thus improving the transmission efficiency when the OFDM signal is transmitted in a burst manner.

OFDM Demodulator

The embodiments of OFDM demodulators of the present invention will now be described.
(First Embodiment)

Figure 1:
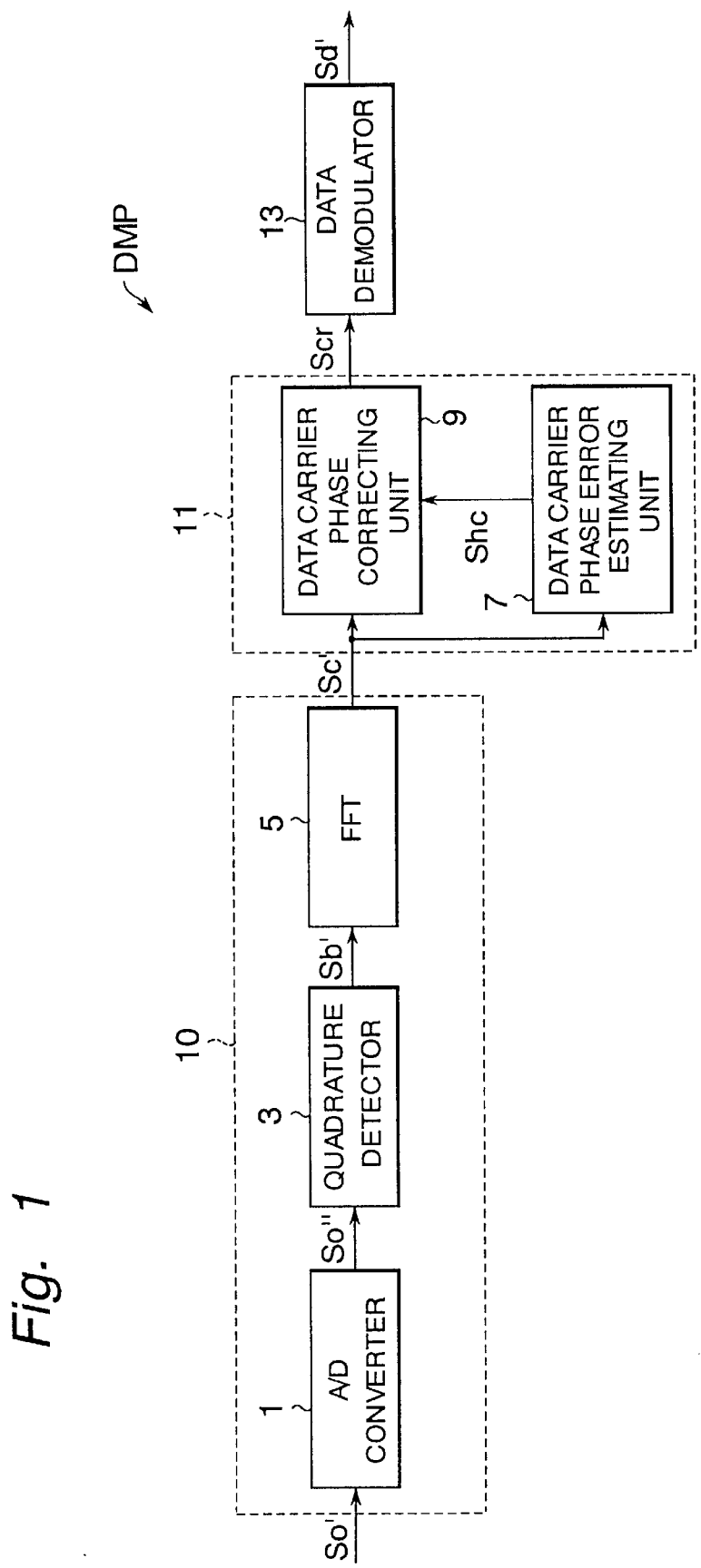
FIG. 1 is a block diagram showing an OFDM demodulator of a first embodiment of the invention.

Referring to FIG. 1, an OFDM demodulator of a first embodiment of the present invention will be described. The OFDM demodulator DMP of this embodiment includes a subcarrier separating portion 10, a phase correcting unit 11, and a data demodulator 13. The subcarrier separating portion 10 includes an A/D converter 1, a quadrature detector 3, and a fast Fourier transform unit 5. The phase correcting unit 11 includes a data carrier phase error estimating unit 7 and a data carrier phase correcting unit 9.

Figure 14:
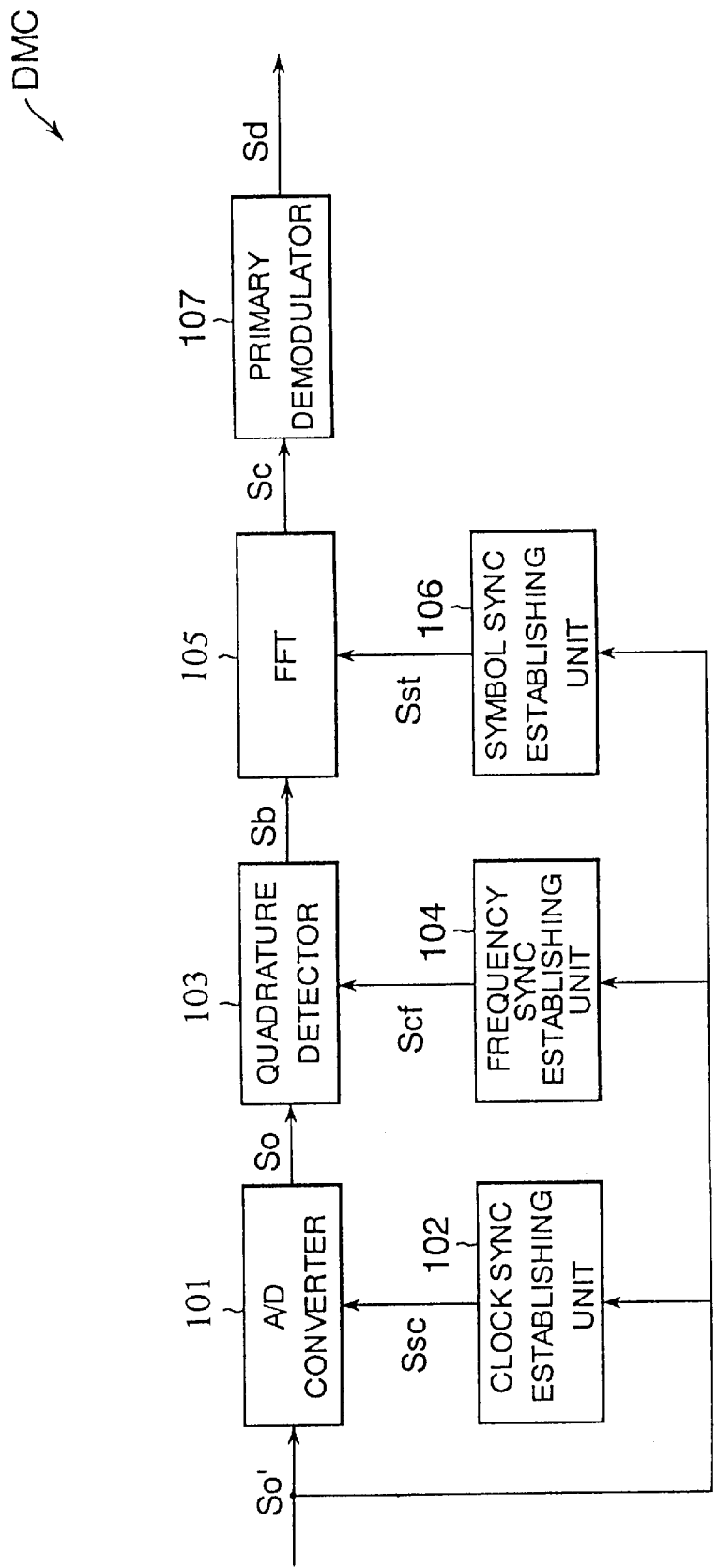
FIG. 14 is a block diagram showing a conventional OFDM demodulator.

The A/D converter 1, quadrature detector 3, and fast Fourier transform unit 5 have basically the same structures, respectively, as the A/D converter 101, quadrature detector 103, and fast Fourier transform unit 105 in the conventional OFDM demodulator DMC shown in FIG. 14. The A/D converter 1 converts the input OFDM signal So" from analog to digital to generate an OFDM signal So", the quadrature detector 3 subjects the OFDM signal So" to quadrature detection to generate an OFDM signal Sb' in the baseband, and the fast Fourier transform unit 5 applies fast Fourier transform to the baseband OFDM signal Sb' to generate a subcarrier signal Sc'.

The OFDM demodulator DMP of this embodiment does not have means corresponding to the clock synchronization establishing unit 102, frequency synchronization establishing unit 104, and symbol synchronization establishing unit 106 in the conventional OFDM demodulator DMC. As a result, the generated signals So", Sb', and Sc' are not synchronized in the sampling clock, subcarrier signal frequency, and symbol window.

The subcarrier signal Sc' which is not synchronized is outputted to the data carrier phase error estimating unit 7 and the data carrier phase correcting unit 9. The data carrier phase error estimating unit 7 estimates phase errors of the data carriers DC in the received OFDM signal So' on the basis of the pilot carriers PC in the OFDM demodulated subcarrier signal Sc', and then generates a phase error correcting signal Shc indicating the amounts of correction SHC for the estimated phase errors and outputs this signal Shc to the data carrier phase correcting unit 9.

The data carrier phase correcting unit 9 directly corrects the data carriers DC in the subcarrier signal Sc' on the basis of the phase error signal Shc to correct the effect (phase rotation) due to clock error, frequency error and symbol error (FFT time window error), and then outputs a phase corrected subcarrier signal Scr to the data demodulator 13. The data carrier phase error estimating unit 7 and the data carrier phase correcting unit 9 form the phase correcting unit 11 for correcting the phase of the OFDM signal.

The method for obtaining the amount of phase error correction performed by the data carrier phase error estimating unit 7 depends on the phase modulation system of the subcarriers SC. For example, when the subcarriers are modulated by an absolute phase modulation such as the QPSK or QAM modulation, the absolute phase error (phase error between the transmitter and receiver) is obtained for each subcarrier. When the subcarriers are modulated by differential modulation such as the DQPSK or DAPSK modulation, the relative phase error between the subcarriers is obtained. However, when the subcarriers are differentially modulated, the amount of phase error correction can also be obtained by obtaining the absolute phase error. Specific structures of the phase correcting unit 11 will be described in detail referring to FIGS. 4, 6, and 8.

FIRST EXAMPLE

Figure 4:
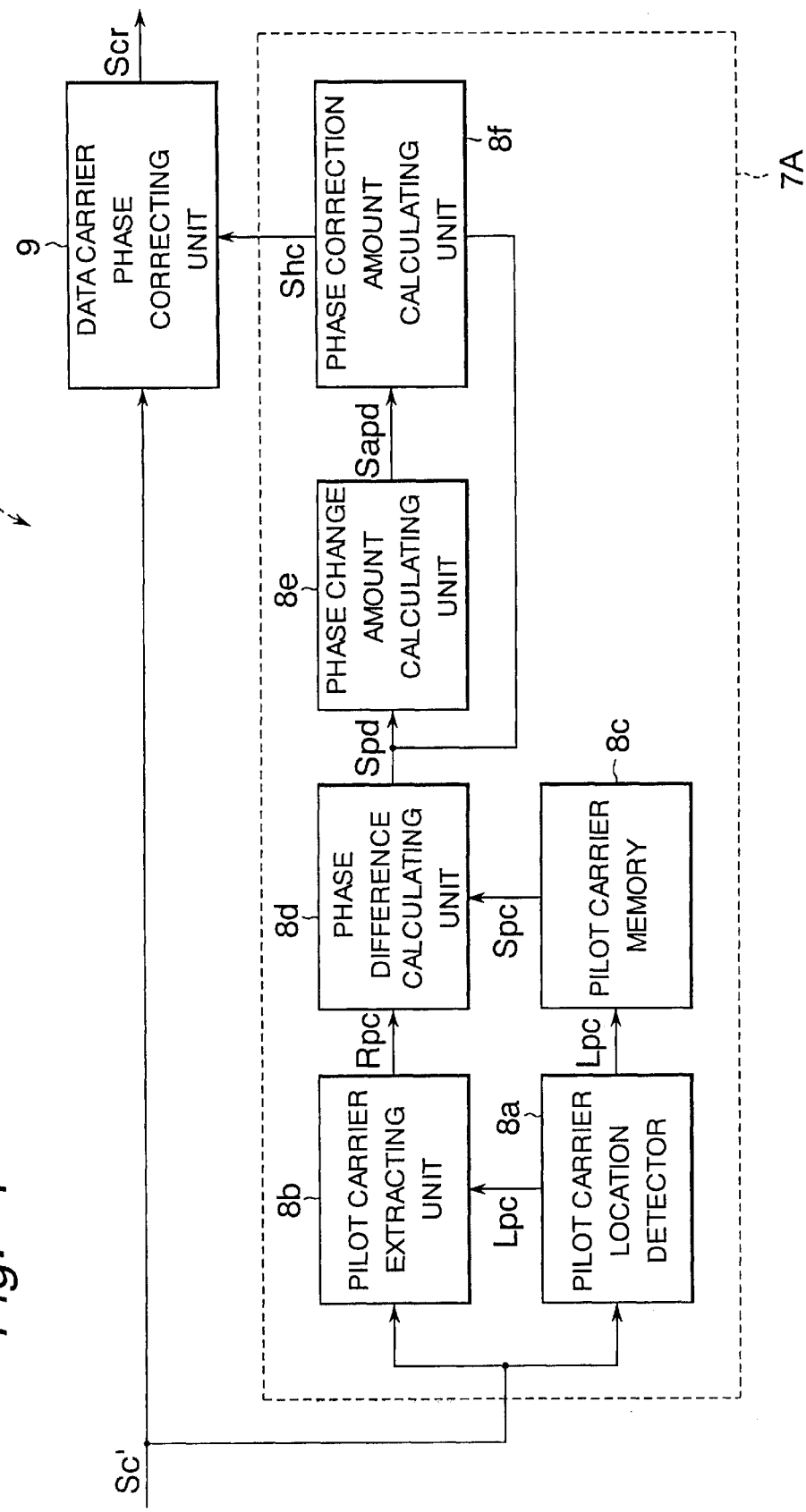
FIG. 4 is a block diagram showing a first example of the OFDM demodulator of the first embodiment of the invention.

Referring to FIG. 4, the phase correcting unit 11 of a first example of the invention will be described. This example is especially suitable for demodulation of an OFDM signal in which the subcarriers SC are subjected to absolute phase modulation. The phase correcting unit 11A for correcting phases of absolute phase modulated subcarriers SC includes a data carrier phase error estimating unit 7A for obtaining absolute phase errors of the subcarriers SC and the data carrier phase correcting unit 9. Further, the data carrier phase error estimating unit 7A includes a pilot carrier location detector 8a, a pilot carrier extracting unit 8b, a pilot carrier memory 8c, a phase difference calculating unit 8d, a phase change amount calculating unit 8e, and a phase correction amount calculating unit 8f. The pilot carrier location detector 8a contains information about locations of subcarriers assigned as the pilot carriers on the transmitting end. The pilot carrier memory 8c holds in advance information SPC about the transmitted pilot carriers PC to which known complex numbers are assigned on the transmitting end.

In the received data Sc' converted into the frequency domain signal Sf in the FFT circuit 5, the subcarriers SC are separated on the same time as shown in FIG. 2 and arranged in the order of frequency. Complex number data showing the plurality of separated and arranged subcarriers are obtained. The plurality of separated subcarriers SC are inputted in parallel to the pilot carrier location detector 8a and the pilot carrier extracting unit 8b in the data carrier phase error estimating unit 7A.

The pilot carrier location detector 8a detects the locations of the pilot carriers PC in the subcarriers Sc' on the basis of the order assigned on the transmitting end, and then generates a pilot carrier location signal Lpc and outputs the same to the pilot carrier extracting unit 8b and the pilot carrier memory 8c. However, the method of detecting the locations of pilot carriers on the basis of the order assigned to the subcarriers on the transmitting end cannot correctly detect the locations of the pilot carriers PC when the frequency offset of the OFDM signal is equal to or larger than the carrier interval, since the locations of the data carriers in the subcarriers SC outputted from the FFT 5 are shifted. In such a case, the pilot carriers PC and the data carriers DC may be modulated at different power levels in the transmitter so that the locations of the pilot carriers PC can be detected on the basis of the modulation power level.

The pilot carrier extracting unit 8b extracts the pilot carriers PC in the input subcarriers Sc'. That is, the pilot carrier extracting unit 8b extracts the subcarriers SC corresponding to the locations of the pilot carriers PC detected in the pilot carrier location detector 8a on the basis of the pilot carrier location signal Lpc to generate a received pilot carrier signal Rpc and outputs the same to the phase difference calculating unit 8d.

The pilot carrier memory 8c reads the information SPC about the pilot carriers PC corresponding to the detected locations of the pilot carriers PC from itself (that is, the known complex numbers assigned to the pilot carriers PC) on the basis of the pilot carrier location signal Lpc and generates a transmitted pilot carrier signal Spc, which is outputted to the phase difference calculating unit 8d.

The phase difference calculating unit 8d compares the received pilot carrier PC(R) extracted by the pilot carrier extracting circuit 8b and the transmitted pilot carrier PC(S) held in the pilot carrier memory 104 on the basis of the received pilot carrier signal Rpc and the transmitted pilot carrier signal Spc to obtain the phase difference PD. The phase difference PD can be obtained by the following method. With the complex number A assigned to the received pilot carrier and the complex number B assigned to the transmitted pilot carrier as inputs, the complex number A and the conjugate complex number of the complex number B are multiplied together and the arc tangent arctan (q/i) is calculated from the obtained complex number C=(i, q).

The phase difference PD can also be obtained by obtaining phases of the complex number A and the complex number B by arc tangent arctan calculation and performing a subtraction between the phases. The phase difference PD thus obtained represents the amount of phase rotation of the carrier with respect to its phase given at the time of transmission that is caused by the frequency error and timing error on the receiving end. The phase difference calculating unit 8*d* generates a transmitter-receiver phase difference signal Spd showing the phase difference PD and outputs the signal Spd to the phase change amount calculating unit 8*e* and the phase correction amount calculating unit 8*f*.

The phase change amount calculating unit 8*e* obtains the amount of phase difference change APD between the transmitter and receiver with respect to the carrier frequency on the basis of the transmitter-receiver phase difference PD and the carrier frequency of each pilot carrier, on the basis of the transmitter-receiver phase difference signal Spd. The amount of phase change APD can be obtained by interpolating the phase change between the pilot carriers. Since the carrier frequency is the frequency of the pilot carrier, it can be obtained by knowing the location of the pilot carrier.

For example, with the transmitter-receiver phase difference PD of the individual pilot carriers shown on the vertical axis and the carrier frequency on the horizontal axis, the slope of the line is obtained by linear approximation, and the amount of phase change can be obtained from the slope. The amount of the phase change between two pilot carriers can also be obtained by dividing a difference between the transmitter-receiver phase differences of arbitrary pilot carriers by the carrier frequency difference between the pilot carriers PC. The amounts may be calculated in order between pilot carriers PC in the symbol and the average value may be obtained to more accurately obtain the amount of phase change. That is to say, with two arbitrary pilot carriers PC represented as PCa and PCb, the difference $\phi a - \phi b$ between the transmitter-receiver phase difference $\phi a$ of the pilot carrier PCa and the transmitter-receiver phase difference $\phi b$ of the pilot carrier PCb is divided by the frequency difference Fa Fb between PCa and PCb, and then the amount of phase change $\Delta \phi$ with respect to the carrier frequency between the pilot carriers PCa and PCb can be obtained. That is to say, the amount of phase change $\Delta \phi$ is given by the equation below.

$$\Delta\phi = ((\phi a - \phi b)/(Fa - Fb))$$

For more details, since the phase errors $\phi$ (k) of all subcarriers must be corrected, the amounts of correction $\phi'(k)$ of the subcarriers can be obtained by accumulating $\Delta \phi$ on the phase error $\phi(k)$ of the first carrier. Accordingly, the amount of correction can be represented as $\phi'(k)=(k\Delta\phi+\phi(0))$.

Figure 5:
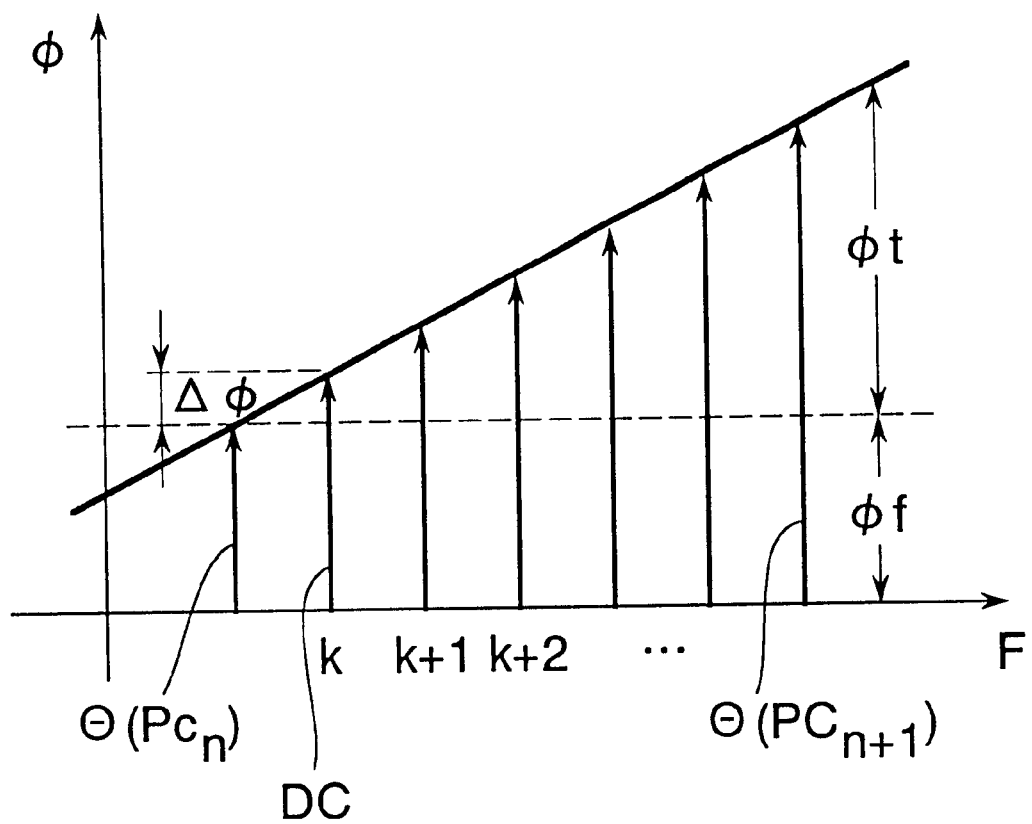
FIG. 5 is a diagram used to explain the phase rotation due to a frequency error and a timing error.

Referring to FIG. 5, the phase rotation due to frequency error $\Phi f$ and timing error $\Phi t$ will be described below. In the diagram, $\Theta(PCn)$ represents the transmitter-receiver phase difference PD of the nth pilot carrier, $\Delta \phi$ represents the phase error between carriers, and k represents Nos. of the data carriers DC. The numbers n and k are positive integers. Each data carrier DC has a phase rotation corresponding to $\Delta \phi$ accumulated on $\Theta$ (PCn). Accordingly, the amount of phase correction SHC for each data carrier can be obtained by accumulating the amount of phase change APD corresponding to the phase error $\Delta \phi$ obtained in the phase change amount calculating unit 8*e* on the basis of the transmitter-receiver phase difference $\Phi$ (PCn) of the pilot carrier PC. Thus, it is possible to obtain the amount of phase rotation of each data carrier DC due to the frequency error $\Phi f$ and the timing error $\Phi t$ with respect to its phase given at the time of transmission.

The phase change amount calculating unit 8*e* generates a phase difference change signal Sapd showing the amount of phase change APD thus obtained and outputs the same to the phase correction amount calculating unit 8*f*.

The phase correction amount calculating unit 8*f* obtains the amount of phase correction S14C for each data carrier from the transmitter-receiver phase difference PD of the pilot carrier and the amount of phase change APD with respect to the carrier frequency, on the basis of the transmitter-receiver phase difference signal Spd and the phase difference change signal Sapd, and then generates a phase error correcting signal Shc. The amount of phase correction SHC for each data carrier can be obtained by the following two methods. At the time when two successive pilot carriers PC1 and PC2 are inputted, the amounts of correction for the data carriers DC between the two pilot carriers PC1 and PC2 are calculated. At the time when all pilot carriers PC in one symbol have been inputted, the amounts of correction to all data carriers DC in one symbol are collectively obtained.

On the basis of the phase error correcting signal Shc, the data carrier phase correcting unit 9 performs the phase correction by correcting the phases of the data carriers by the amounts of phase correction on the basis of the amounts of phase correction SHC for the respective data carriers. As stated above, until the phase correction amount calculating unit 8*f* finishes calculating the amounts of phase correction SHC on the basis of the plurality of pilot carriers PC, at least the phase correction to the data carriers DC located between the plurality of pilot carriers PC cannot be conducted. Therefore, the data carriers DC must be held in that period. To hold the data carriers DC, a buffer having an appropriate capacity may be provided in the data carrier phase correcting unit 9, or the buffer provided in the fast Fourier transform unit 5 to be used in the Fourier calculation may be shared by appropriately controlling the reading timing. The phase corrected data carriers Scr are demodulated in the data demodulator 13 and the transmitted data Sd' is thus reproduced.

In the first example, any method can be used to modulate the data carriers DC, such as the QPSK or 16QAM, or a differential modulation method such as DQPSK or 16 DAPSK may be used, for example. These calculations can be realized by using a DSP (Digital Signal Processor), for example. The process steps of and after FFT may be carried out in a form recorded in a recording medium as a program.

SECOND EXAMPLE

Figure 6:
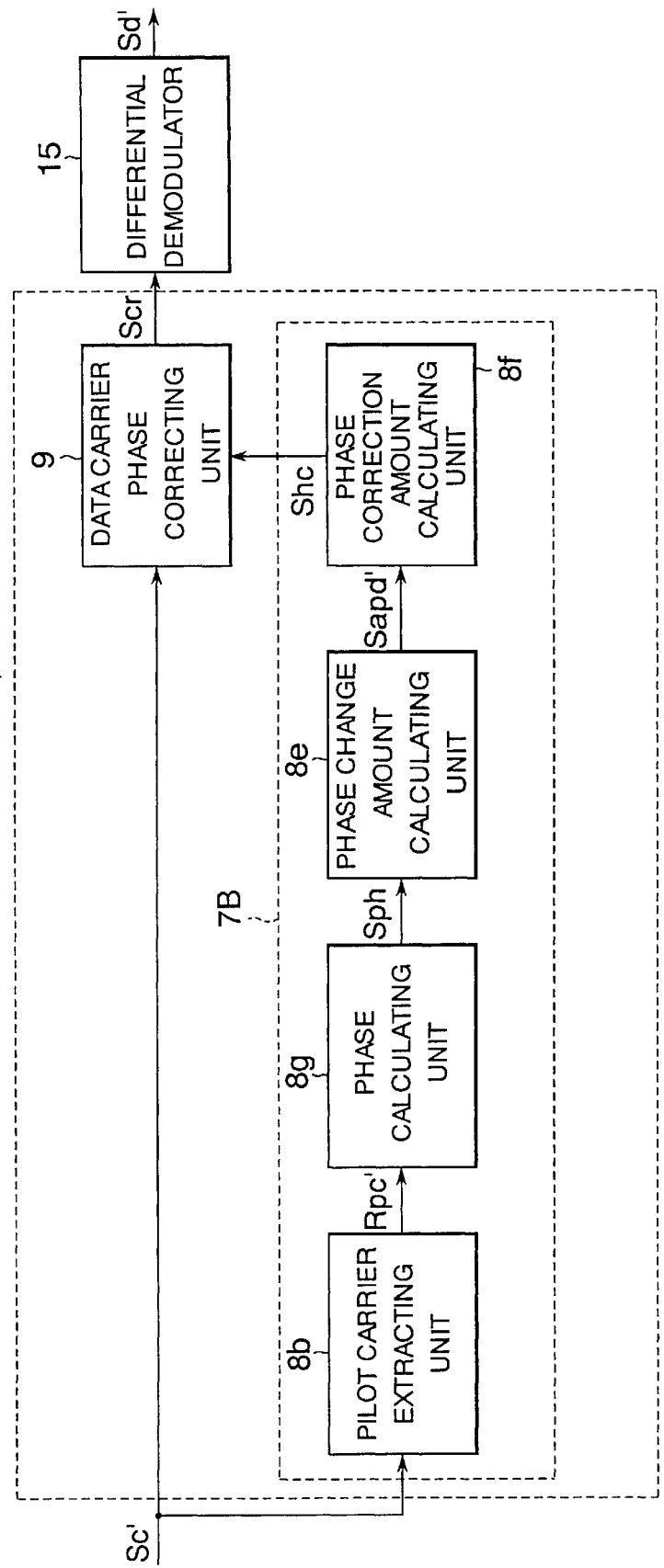
FIG. 6 is a block diagram showing a second example of the OFDM demodulator of the first embodiment of the invention.

Referring to FIG. 6, the phase correcting unit 11 of a second example of the invention will be described. Unlike the phase correcting unit 11A of the first example, the phase correcting unit 11B in this example is especially suitable for the demodulation of an OFDM signal in which the subcarriers SC are subjected to differential modulation, such as the OFDM signal obtained in the OFDM modulator of the second embodiment described previously. When the data carriers DC are subjected to differential modulation between subcarriers adjacent in the frequency direction, the constant phase rotation due to frequency error is cancelled in differential demodulation, but the phase error due to timing error is added to the phase difference between adjacent carriers and then the differential demodulation cannot be achieved correctly.

Figure 7:
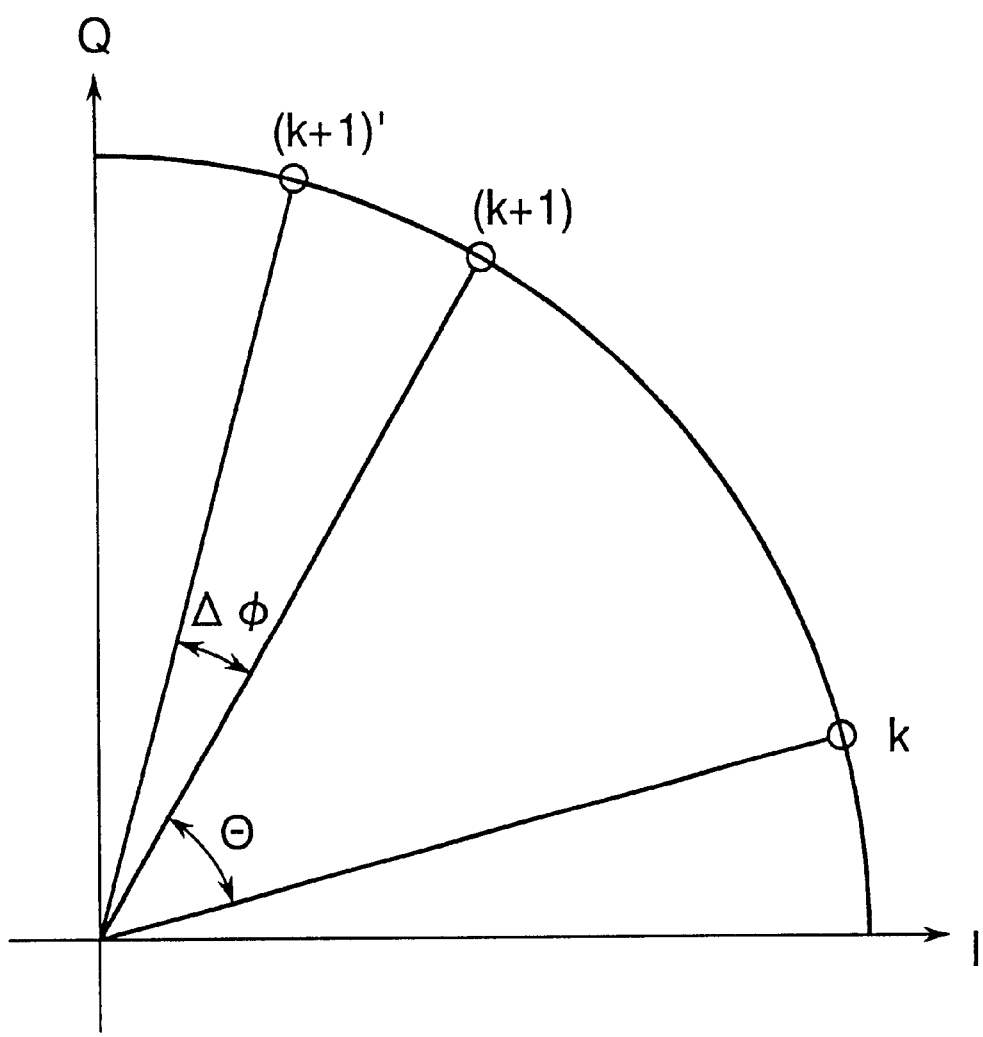
FIG. 7 is an explanation diagram showing an OFDM signal produced by differential modulation.

FIG. 7 shows an OFDM signal subjected to differential modulation. The character k denotes Nos. of subcarriers SC. On the transmitting end, transmitted data is assigned to the phase difference e between the subcarrier k and subcarrier k+1. When a timing error occurs, a phase error occurs in proportion to the subcarrier frequency. Accordingly, the subcarrier k+1 becomes (k+1)', which is rotated by the phase error ΔΦ from the original phase difference, with respect to the subcarrier k.

The phase difference between the subcarrier (k+1)' and the subcarrier k is now Θ+ΔΦ, and then the transmitted data cannot be correctly reproduced by differential demodulation between the adjacent subcarriers. Accordingly, this example is constructed as explained below to obtain only the phase errors between adjacent subcarriers for phase correction. The OFDM demodulator of this example has a phase correcting unit 11B in place of the phase correcting unit 11A and a differential demodulator 15 in place of the data demodulator 13.

The phase correcting unit 11B has a data carrier phase error estimating unit 7B in place of the data carrier phase error estimating unit 7A in the phase correcting unit 11A. The data carrier phase error estimating unit 7B does not have the pilot carrier location detector 8a and the pilot carrier memory 8c in the data carrier phase error estimating unit 7A, and has a phase calculating unit 8g in place of the phase difference calculating unit 8d, and the output from the phase difference calculating unit 8d to the phase correction amount calculating unit 8f is removed.

The received data Sc' converted into the frequency domain and separated into subcarriers in the FFT circuit 5 is inputted to the pilot carrier extracting unit 8b in the data carrier phase error estimating unit 7B.

The pilot carrier extracting unit 8b extracts the pilot carriers PC in the subcarriers Sc' to generate a received pilot carrier signal Rpc' and outputs the same to the phase calculating unit 8g.

The phase calculating unit 8g obtains the phases of the received pilot carriers PC(R) extracted by the pilot carrier extracting unit 8b on the basis of the received pilot carrier signal Rpc'. In the phase calculation, the phase PH of the received pilot carrier PC(R) can be obtained by calculating the arc tangent arctan (q/i) from the complex number (i, q) assigned to the received pilot carrier PC(R) to be inputted. An approximate value of the phase of the received pilot carrier PC(R) may be obtained by calculating q/i from the complex number (i, q).

In this example, since the subcarriers included in the OFDM signal are subjected to differential modulation between subcarriers adjacent in the frequency direction, only the phase error between the subcarriers is obtained, without considering how much each subcarrier has rotated from the phase given at the time of transmission. Further, since the subcarriers are subjected to differential modulation and the transmitted pilot carriers are in the same phase, it is not necessary to obtain the phase difference between the transmitter and receiver by comparing phases between the received pilot carrier and the transmitted pilot carrier, as is done by the data carrier phase error estimating unit 7A (phase difference calculating unit 8d) in the first example. After detecting the phase PH of the received pilot carrier, the phase calculating unit 8g generates a received pilot carrier phase signal Sph and outputs the signal Sph to the phase change amount calculating unit 8e.

Then, on the basis of the received pilot carrier phase signal Sph, from the phases PH of the received pilot carriers PC(R) obtained in the phase calculating unit 8g and the carrier frequencies, the phase change amount calculating unit 8e obtains the amount of phase change APD between the transmitter and receiver with respect to the carrier frequency by using linear approximation or the like, similar to the first example. The phase change amount calculating unit 8e then outputs a phase difference change signal Sapd' indicating the obtained amount of phase change APD' to the phase correction amount calculating unit 8f.

The phase correction amount calculating unit 8f obtains the amounts of phase correction HC between the carriers on the basis of the phase difference change signal Sapd'. In this example, since the data carriers DC are subjected to differential modulation between adjacent carriers, only the amount of phase rotation due to a timing error between adjacent carriers is corrected. In this case, the phase correction amount calculating unit 8f calculates the amount of phase correction for correcting the phase error corresponding to the carrier frequency between compared carriers. For example, when adjacent carriers are compared, the phase error for one carrier frequency interval is obtained, in which case the amount of phase change APD' for the carrier frequency obtained in the phase change amount calculating unit 8e corresponds to the phase error ΔΦ. When carriers separated by two carrier frequency intervals are compared, the amount of phase correction is obtained by calculating 2ΔΦ.

For more details, since information is placed on the phase difference between subcarriers SC in the differential modulation, the phase difference assigned to data is represented as $\theta k+1-\theta_k=\theta d$ ($\theta_k$ denotes the phase of the kth subcarrier). The phase difference does not change even if the same phase error occurs in the subcarriers SC after the OFDM signal is received on the receiving end. However, when a phase error $k\Delta\phi$ proportional to the subcarrier frequency (k) exists, then $\theta_{k'+1}-\theta_{k'}=\theta d+\Delta\phi$. Hence $\Delta\phi$ is obtained as the amount of correction.

The data carrier phase correcting unit 9 corrects the phases of data carriers Sc'outputted from the fast Fourier transform unit 5 on the basis of the amounts of phase correction HC obtained in the phase correction amount calculating unit 8f The phase correction is achieved by correcting two data carriers to be subjected to differential demodulation by the amount of phase correction between the data carriers.

The differential demodulator 15 subjects the phase corrected subcarrier signal Scr outputted from the data carrier phase correcting unit 9 to differential demodulation to reproduce the transmitted data Sd'.

In this example, the data carriers are modulated by means of a differential modulation method between adjacent carriers, where a multi-valued differential phase shift keying such as DQPSK or a multi-valued differential amplitude and phase shift keying method such as 16DAPSK can be used, for example. In this way, when adjacent data carriers are subjected to differential modulation, the amount of phase correction can be easily calculated in the receiver, and then the structure can be simplified as compared with that of the first example. In this example, the phases of the subcarriers themselves are corrected, that is to say, the phase errors due to timing error are corrected. The phase difference between the corrected subcarriers is then obtained, so that the phase error due to frequency error cancelled, and the obtained phase difference is de-mapped to demodulate the data.

These calculations can be realized by using a DSP, for example, as in the first example. Further, the processing steps of and after FFT can be executed in a form recorded in a recording medium as a program.

THIRD EXAMPLE

Figure 8:
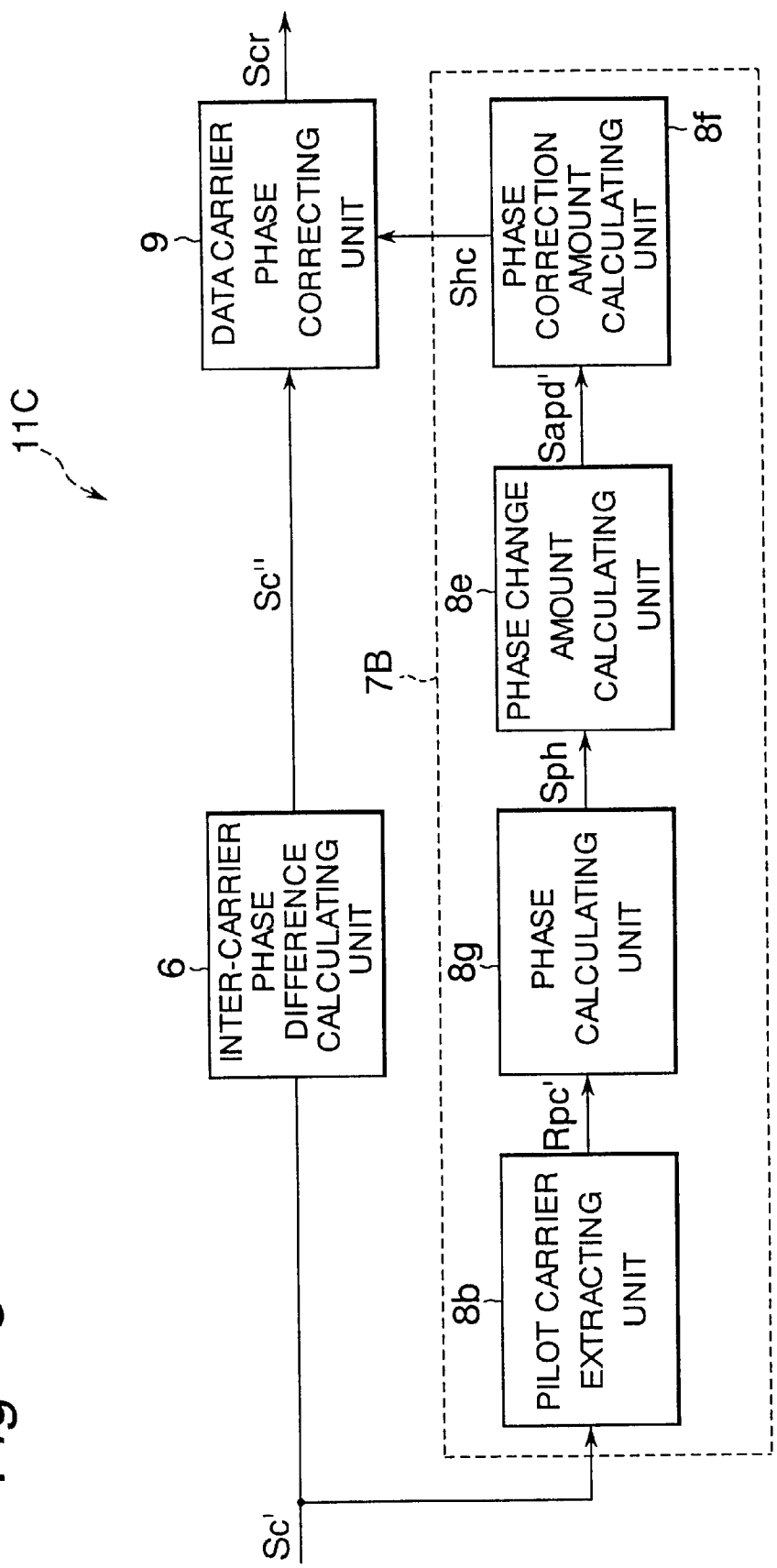
FIG. 8 is a block diagram showing a third example of the OFDM demodulator of the first embodiment of the invention.

Referring to FIG. 8, the phase correcting unit 11 according to a third example of the present invention will be described. Similar to the phase correcting unit 11B of the second example, the phase correcting unit 11C of this example is especially suitable for the demodulation of an OFDM signal in which the subcarriers SC are modulated by means of differential modulation between subcarriers adjacent in the frequency direction. The phase correcting unit 11C has an inter-carrier phase difference calculating unit 6 between the data carrier phase correcting unit 9 and the fast Fourier transform unit 5 in the phase correcting unit 11B of the second example, and has the data demodulator 13 in place of the differential demodulator 15. Since the structure and operation of the data carrier phase error estimating unit 7B have already been explained, only the inter-carrier phase difference calculating unit 6 will be described.

The inter-carrier phase difference calculating unit 6 calculates phase differences between adjacent subcarriers corresponding to the transmitted data from the subcarriers Sc' outputted from the fast Fourier transform unit 5, and then outputs the result of calculation to the data carrier phase correcting unit 9 as a phase difference signal Sc". In the phase difference signal Sc", the phase error due to frequency error is already cancelled, but phase errors due to a timing error are still contained.

The data carrier phase correcting unit 9 applies phase correction to the phase difference signal Sc" on the basis of the phase error correcting signal Shc, and then outputs a phase corrected subcarrier signal Scr to the data demodulator 13.

Also in this example, the data carriers are subjected to differential modulation between carriers adjacent in the frequency direction as in the second example, where a multi-valued differential phase shift keying such as DQPSK or a multi-valued differential amplitude and phase shift keying such as 16DAPSK can be used, for example. These calculations can be realized by using a DSP, for example, similar to the first example. Further, the processing step of and after FFT can be executed in a form recorded in a recording medium as a program. In this way, in this example, when phase differences between subcarriers are obtained by inter-carrier phase difference calculation, the phase error due to frequency error is cancelled. Subsequently, the phase differences obtained between the subcarriers are corrected to correct the phase errors due to a timing error. Then the corrected phase difference is de-mapped to demodulate the data.

As stated above, the OFDM demodulators DMP of the first embodiment of the present invention can accurately perform demodulation even when the synchronizing symbols RS are not inserted in frames like the OFDM signal shown in FIG. 13 due to the phase correction performed on the basis of the pilot carriers PC in known phase that are inserted in the OFDM symbols.

(Second Embodiment)

Figure 9:
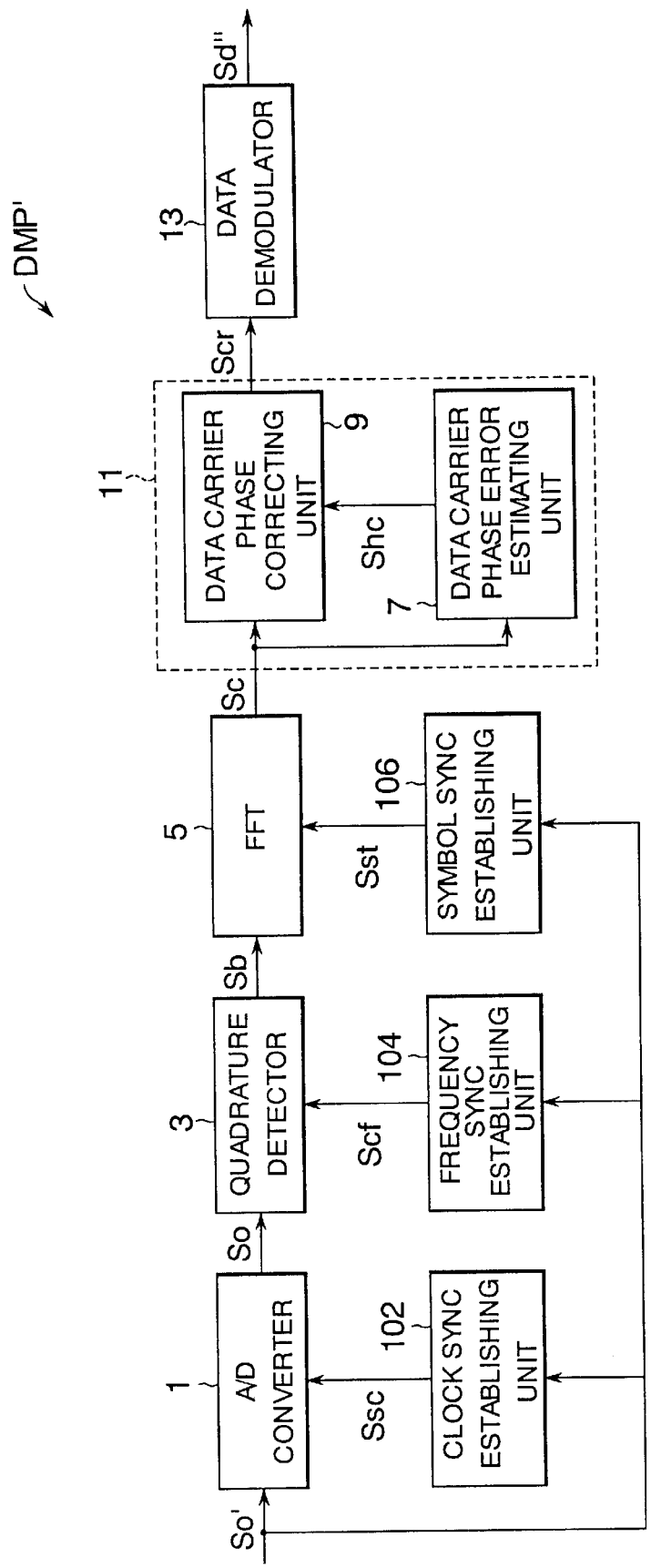
FIG. 9 is a block diagram showing an OFDM demodulator of a second embodiment of the present invention.

An OFDM demodulator according to a second embodiment of the present invention will now be described referring to FIG. 9. The OFDM demodulator DMP' of this embodiment is suitable to demodulate a conventional OFDM signal transmitted in frames with the synchronizing symbols RS. The OFDM signal used in this embodiment has a structure in which the pilot carriers PC shown in FIGS. 2 and 3 are buried in the symbols in the frames shown in FIG. 13. With the OFDM signal thus constructed, synchronization is established to some extent by the synchronization establishing units shown in FIG. 14 on the basis of the synchronization reference symbols RS, and then errors that cannot be corrected by the synchronization establishing units are compensated for by the phase correcting unit 11 shown in FIG. 1, to further improve the accuracy of demodulation.

That is to say, in the structure of the OFDM demodulator DMP' of this embodiment, the clock synchronization establishing unit 102, frequency synchronization establishing unit 104, and the symbol synchronization establishing unit 106 shown in FIG. 14 are added to the OFDM demodulator DMP shown in FIG. 1. As a result, the fast Fourier transform unit 5 applies fast Fourier transform to the OFDM signal Sb in the baseband on the basis of the symbol time window signal Sst, separates the signal Sb in the baseband from the signal in the time domain to the subcarriers Sc in the frequency domain for each OFDM symbol OS, and generates the symbol-synchronized subcarrier signal Sc to output the signal Sc to the phase correcting unit 11. In this subcarrier signal Sc, the sampling clock synchronization and carrier signal frequency synchronization are established, as well as the symbol window synchronization.

Subsequently, any one of the various phase correcting units 11, 11A, 11B, and 11C described in the first embodiment applies phase correction to the synchronized subcarrier signal Sc, which enables more accurate demodulation.

This embodiment will now be described in a case where an error exists between the sampling clock in the receiver and the sampling clock in the transmitter when A/D conversion is performed to the analog OFDM signal So'. In the OFDM demodulation, an FFT is applied for each OFDM symbol period to convert the signal in the time domain to the signal in the frequency domain and the signal is separated into subcarriers. Data (signal values) corresponding to the number of points used in FFT are taken out from one OFDM symbol and inputted to the FFT circuit. This is called an effective symbol period. The number of points used in FFT is 1024 or 512, for example. When a sampling clock error occurs between the transmitter and receiver, a timing error occurs even when data of the same number of points (e.g., 1024) is taken in.

Figure 10:
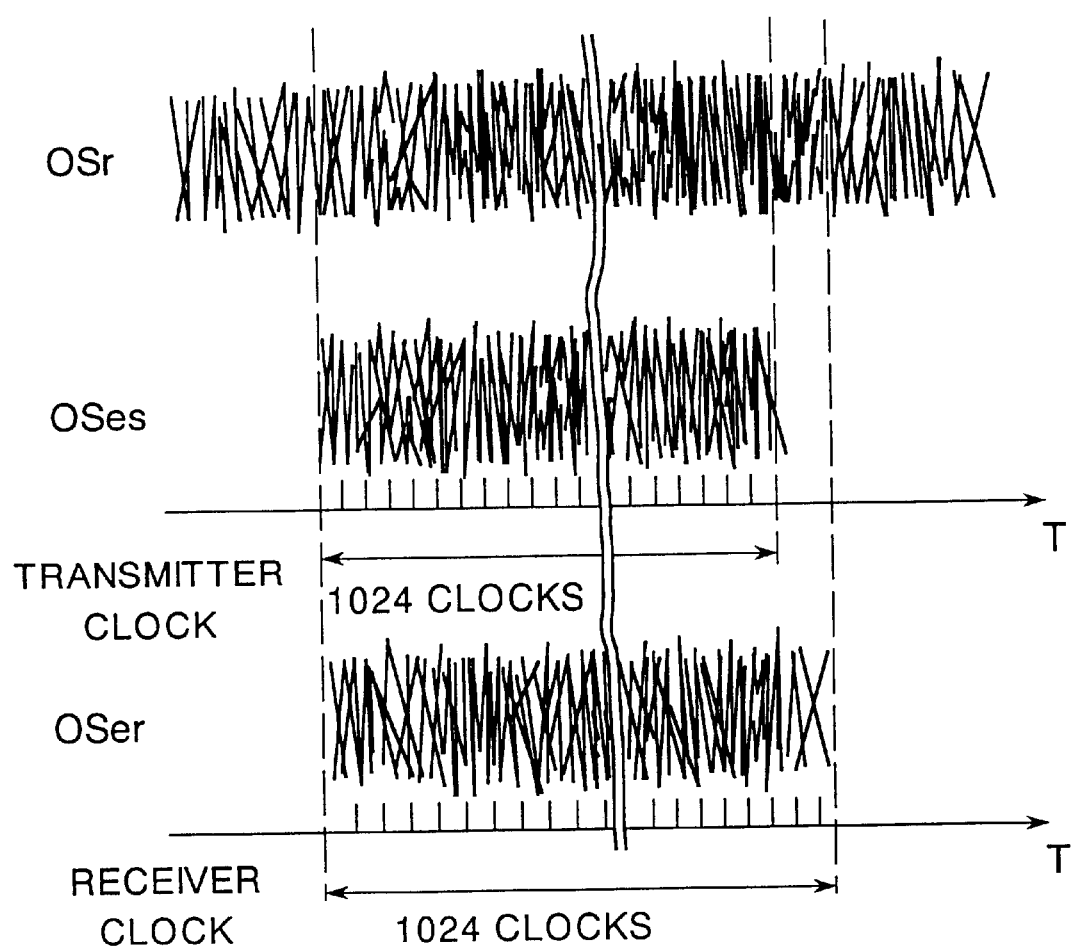
FIG. 10 is an explanation diagram showing an OFDM signal suffering from a timing error between the transmitter and receiver.

FIG. 10 shows such timing error between the transmitter and receiver. The reference character OSr shows one of the OFDM symbols received. The guard interval is removed from the received OFDM symbol and data for 1024 points used in FFT, or an effective symbol period, is taken out. The reference character OSes shows the effective symbol period at the time when the symbol is generated in the transmitter. When a sampling clock error occurs between the transmitter and receiver, the receiver takes in the effective symbol period as shown by OSer, and a timing error thus occurs with respect to the original effective symbol period.

When the FFT is applied to the effective symbol period thus captured, the timing error of the effective symbol period causes phase rotation of the subcarriers. FIG. 5 shows this state. The amount of phase rotation due to the timing error of the effective symbol period is proportional to the subcarrier frequency. When the quadrature detection is performed with a frequency error occurring between the transmitter and receiver, the subcarriers suffer phase rotation of a constant value independent of the subcarrier frequency.

Figure 11:
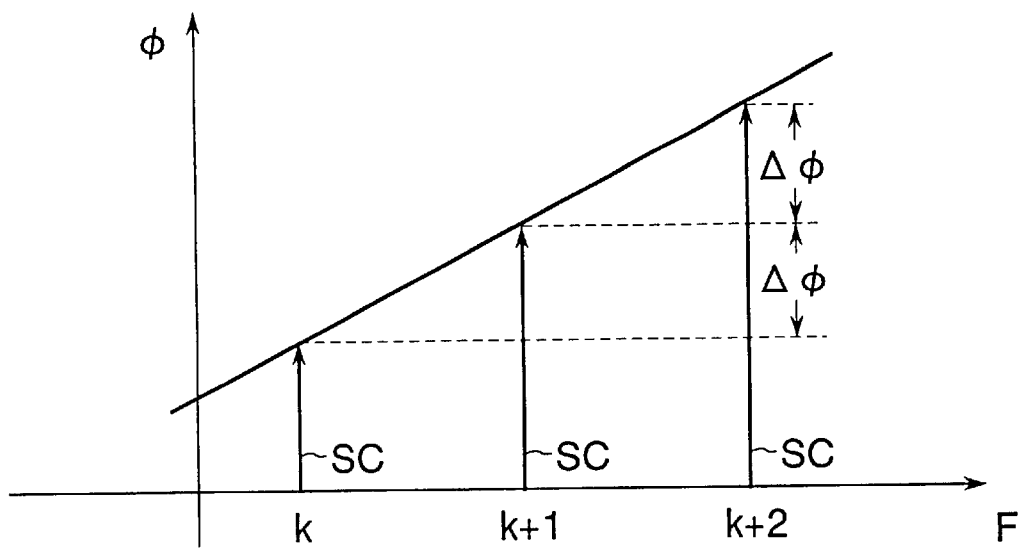
FIG. 11 is an explanation diagram showing phase rotation between adjacent carriers due to a timing error in the OFDM signal.

Thus, the received subcarriers suffer the constant phase rotation due to frequency error and the phase rotation proportional to the carrier frequency. Since the subcarriers in the OFDM signal are arranged at constant frequency intervals, the amount of phase rotation between adjacent subcarriers has a constant value. FIG. 11 shows this state. The character k denotes the subcarrier number.

Since the amount of phase rotation due to a timing error is proportional to the frequency, the amount of phase change between adjacent carriers can be obtained from the inclination of this line, which corresponds to the phase error ΔΦ between adjacent carriers. Hence, the data can be correctly demodulated in the receiver by obtaining the constant phase rotation due to frequency error and the phase rotation due to timing error that is proportional to the carrier frequency and correcting the phases of the data carriers. Hence, in this embodiment, the received signal, which is subjected to OFDM demodulation and separated into individual subcarriers, is corrected in phase, as explained above, and then demodulated.

As explained in detail above, according to the present invention, data can be correctly demodulated even when a frequency error and a timing error exist between the transmitter and receiver. Further, while stable clock synchronization is very difficult with an OFDM signal transmitted in a burst manner, the present invention can correct phase errors due to frequency error and timing error for each OFDM symbol, and data can be correctly demodulated even from such a burst-type OFDM signal.

While the invention has been described in detail, the foregoing description is in all aspects illustrative and not restrictive. It is understood that numerous other modifications and variations can be devised without departing from the scope of the invention.

What is claimed is:

1. An OFDM demodulator for receiving an OFDM signal generated from a plurality of subcarriers modulated with transmitted data for each given-length symbol, said OFDM demodulator comprising:

Fourier transform means for separating the OFDM signal into the plurality of subcarriers by Fourier transform to generate a first subcarrier signal;

carrier phase error detecting means for obtaining an amount of phase correction for each of the plurality of subcarriers in the first subcarrier signal based on subcarriers of known phase assigned as pilot carriers to provide phase reference in the first subcarrier signal; and phase correcting means for correcting a phase of the first subcarrier signal based on the amounts of phase correction to generate a second subcarrier signal, wherein said carrier phase error detecting means comprises:

pilot carrier location detecting means for detecting locations of the pilot carriers in the first subcarrier signal to generate a pilot carrier location' signal;

pilot carrier extracting means for extracting a first pilot carrier from the first subcarrier signal based on the pilot carrier location signal;

a pilot carrier memory operable to hold known pilot carriers and read a second pilot carrier corresponding to the detected location among the known pilot carriers based on the pilot carrier location signal;

phase difference calculating means for calculating a phase difference between the first and second pilot carriers to generate a phase difference signal indicating the phase difference;

phase change amount calculating means for calculating an amount of change of phase rotation between transmitting and receiving ends with respect to a carrier frequency based on the phase difference signal and generating a phase difference change signal indicating the amount of change; and phase correction amount calculating means for calculating an amount of phase correction for each of the plurality of subcarriers based on the phase difference signal and the phase difference change signal and generating a phase error correcting signal.

2. The OFDM demodulator according to claim 1, further comprising data demodulating means for demodulating the second subcarrier signal to reproduce the transmitted data.

3. The OFDM demodulator according to claim 1, wherein said phase difference calculating means obtains the phase difference between the first and second pilot carriers by receiving first and second complex numbers representing the first and second pilot carriers as inputs, multiplying the first complex number and a conjugate complex number of the second complex number to obtain a third complex number, and calculating an arc tangent arctan (q/i) from real part i and imaginary part q of the third complex number.

4. The OFDM demodulator according to claim 1, wherein said phase difference calculating means obtains the phase difference between the first and second pilot carriers by receiving first and second complex numbers representing the first and second pilot carriers as inputs, obtaining their phases $\Theta_A$ and $\Theta_B$ by an arc tangent arctan calculation, and calculating $\Theta_A - \Theta_B$.

5. The OFDM demodulator according to claim 1, wherein said phase change amount calculating means obtains the amount of phase change with respect to the carrier frequency by estimating phase changes of other subcarriers from a phase of an arbitrary one of the pilot carriers among phases of the pilot carriers existing for each given carrier frequency.

6. The OFDM demodulator according to claim 5, wherein said phase change amount calculating means obtains the amount of phase change with respect to the carrier frequency by interpolating the phase changes of other subcarriers from the phases of at least two pilot carriers among the phases of the pilot carriers existing for each given carrier frequency.

7. The OFDM demodulator according to claim 5, wherein said phase change amount calculating means obtains the amount of phase change with respect to the carrier frequency from a slope of a line obtained by linearly approximating the phase changes of other subcarriers from the phases of at least two pilot carriers among the phases of the pilot carriers existing for each given carrier frequency.

8. The OFDM demodulator according to claim 5, wherein said phase change amount calculating means obtains the amount of phase change with respect to the carrier frequency by dividing a phase difference between the phases of two pilot carriers among the phases of the pilot carriers existing for each given carrier frequency by a difference in carrier frequency between the two pilot carriers.

9. The OFDM demodulator according to claim 5, wherein said phase change amount calculating means obtains the amount of phase change with respect to the carrier frequency by dividing a phase difference between two pilot carriers among the phases of the pilot carriers existing for each given carrier frequency by a frequency difference between the two pilot carriers a plurality of times for different pairs of the pilot carriers to obtain a plurality of division results within an OFDM symbol, and then averaging the plurality of division results.

10. The OFDM demodulator according to claim 1, wherein the pilot carriers in the OFDM signal are assigned to the plurality of subcarriers at constant frequency intervals.

11. The OFDM demodulator according to claim 1, wherein the pilot carriers in the OFDM signal are assigned to the plurality of subcarriers at frequency intervals increasing by given increments.

12. The OFDM demodulator according to claim 1, wherein the pilot carriers in the OFDM signal are assigned to the plurality of subcarriers at frequency intervals defined by a given PN sequence.

13. The OFDM demodulator according to claim 1, wherein the OFDM signal is continuously inputted.

14. The OFDM demodulator according to claim 1, wherein the OFDM signal is inputted in a burst manner.

15. An OFDM demodulator for receiving an OFDM signal generated from a plurality of subcarriers modulated with transmitted data for each given-length symbol, said OFDM demodulator comprising:

Fourier transform means for separating the OFDM signal into the plurality of subcarriers by Fourier transform to generate a first subcarrier signal;

carrier phase error detecting means for obtaining an amount of phase correction for each of the plurality of subcarriers in the first subcarrier signal based on subcarriers of known phase assigned as pilot carriers to provide phase reference in the first subcarrier signal; and phase correcting means for correcting a phase of the first subcarrier signal based on the amounts of phase correction to generate a second subcarrier signal, wherein the plurality of subcarriers in the OFDM signal are subjected to differential modulation between subcarriers adjacent in frequency direction with reference to the pilot carriers, wherein said carrier phase error detecting means comprises:

pilot carrier extracting means for extracting a pilot carrier from the first subcarrier signal;

phase calculating means for calculating a phase of the pilot carrier based on the extracted pilot carrier;

phase change amount calculating means for calculating an amount of phase change from the calculated phase of the pilot carrier; and phase correction amount calculating means for calculating an amount of phase correction between the plurality of subcarriers based on the calculated amount of phase change, and wherein said phase correcting means corrects the phase of the first subcarrier signal based on the calculated amount of phase correction.

16. The OFDM demodulator according to claim 15, further comprising differential demodulation means for reproducing the transmitted data by subjecting the second subcarrier signal to differential demodulation.

17. The OFDM demodulator according to claim 15, further comprising inter-carrier phase difference calculating means for calculating a phase difference between the adjacent subcarriers based on the first subcarrier signal, and wherein said phase correcting means corrects the phase difference indicated by an output of said inter-carrier phase difference calculating means based on the calculated amount of phase correction.

18. The OFDM demodulator according to claim 15, wherein said phase calculating means obtains the phase of the extracted pilot carrier by calculating an arc tangent arctan (q/i) from real part i and imaginary part q of a complex number representing the extracted pilot carrier.

19. The OFDM demodulator according to claim 15, wherein said phase calculating means obtains an approximate value of the phase of the extracted pilot carrier by calculating q/i from real part i and imaginary part q of a complex number representing the extracted pilot carrier.

20. The OFDM demodulator according to claim 15, wherein a multi-valued differential phase shift keying is used as the differential modulation.

21. The OFDM demodulator according to claim 15, wherein a multi-valued differential amplitude and phase shift keying is used as the differential modulation.

22. The OFDM demodulator according to claim 15, wherein said phase change amount calculating means obtains the amount of phase change with respect to a carrier frequency by estimating phase changes of other subcarriers from a phase of an arbitrary one of the pilot carriers among phases of the pilot carriers existing for each given carrier frequency.

23. The OFDM demodulator according to claim 15, wherein the pilot carriers in the OFDM signal are assigned to the plurality of subcarriers at constant frequency intervals.

24. The OFDM demodulator according to claim 15, wherein the pilot carriers in the OFDM signal are assigned to the plurality of subcarriers at frequency intervals increasing by given increments.

25. The OFDM demodulator according to claim 15, wherein the pilot carriers in the OFDM signal are assigned to the plurality of subcarriers at frequency intervals defined by a given PN sequence.

26. The OFDM demodulator according to claim 15, wherein the OFDM signal is continuously inputted.

27. The OFDM demodulator according to claim 15, wherein the OFDM signal is inputted in a burst manner.

28. An OFDM demodulation method for demodulating an OFDM signal generated from a plurality of subcarriers modulated with transmitted data for each given-length symbol, said OFDM demodulation method comprising:

separating the OFDM signal into the plurality of subcarriers by Fourier transform to generate a first subcarrier signal;

obtaining an amount of phase correction for each of the plurality of subcarriers in the first subcarrier signal based on subcarriers of known phase assigned as pilot carriers to provide phase reference in the first subcarrier signal; and correcting a phase of the first subcarrier signal based on the amounts of phase correction to generate a second subcarrier signal, wherein said obtaining of the amount of phase correction comprises:

detecting locations of the pilot carriers in the first subcarrier signal to generate a pilot carrier location signal;

extracting a first pilot carrier from the first subcarrier signal based on the pilot carrier location signal;

holding known pilot carriers and reading a second pilot carrier corresponding to the detected location among the known pilot carriers based on the pilot carrier location signal;

calculating a phase difference between the first and second pilot carriers to generate a phase difference signal indicating the phase difference;

calculating an amount of change of phase rotation between transmitting and receiving ends with respect to a carrier frequency based on the phase difference signal and generating a phase difference change signal indicating the amount of change; and calculating an amount of phase correction for each of the plurality of subcarriers based on the phase difference signal and the phase difference change signal and generating a phase error correcting signal.

29. An OFDM demodulation method for demodulating an OFDM signal generated from a plurality of subcarriers modulated with transmitted data for each given-length symbol, said OFDM demodulation method comprising:

separating the OFDM signal into the plurality of subcarriers by Fourier transform to generate a first subcarrier signal;

obtaining an amount of phase correction for each of the plurality of subcarriers in the first subcarrier signal based on subcarriers of known phase assigned as pilot carriers to provide phase reference in the first subcarrier signal; and correcting a phase of the first subcarrier signal based on the amounts of phase correction to generate a second subcarrier signal, wherein the plurality of subcarriers in the OFDM signal are subjected to differential modulation between subcarriers adjacent in frequency direction with reference to the pilot carriers, wherein said obtaining of the amount of the phase correction comprises:
extracting a pilot carrier from the first subcarrier signal;
calculating a phase of the pilot carrier based on the extracted pilot carrier;
calculating an amount of phase change from the calculated phase of the pilot carrier; and
calculating an amount of phase correction between the plurality of subcarriers based on the calculated amount of phase change, and wherein the phase of the first subcarrier signal is corrected based on the calculated amount of phase correction in said correcting of the phase.

30. The OFDM demodulation method according to claim 29, further comprising calculating a phase difference between the adjacent subcarriers based on the first subcarrier signal, wherein the phase difference between the adjacent subcarriers calculated in said calculating of the phase difference is corrected based on the calculated amount of phase correction in said correcting of the phase.

31. An OFDM transmission system for transmitting an OFDM signal generated from a plurality of subcarriers modulated with transmitted data for each given-length symbol from a transmitting end to a receiving end through a wired or radio transmission path, wherein said transmitting end comprises an OFDM modulator comprising:
data modulation means for assigning subcarriers of known phase from among a plurality of subcarriers among transmission subcarriers used in the transmission of the OFDM signal as pilot carriers to provide phase reference, and modulating data carriers which are the subcarriers other than the pilot carriers among the transmission subcarriers with the transmitted data; and
OFDM signal generating means for generating the OFDM signal from the transmission subcarriers including the pilot carriers and the data carriers after modulation, wherein said receiving end comprises an OFDM demodulator comprising:
Fourier transform means for separating the OFDM signal into the plurality of subcarriers by Fourier transform to generate a first subcarrier signal;
phase error calculating means for obtaining an amount of phase correction for each of the plurality of subcarriers in the first subcarrier signal based on subcarriers of known phase assigned as pilot carriers in the first subcarrier signal, and
phase correcting means for correcting a phase of the first subcarrier signal based on the amounts of phase correction to generate a second subcarrier signal, and wherein said phase error calculating means comprises:
pilot carrier location detecting means for detecting locations of the pilot carriers in the first subcarrier signal to generate a pilot carrier location signal;
pilot carrier extracting means for extracting a first pilot carrier from the first subcarrier signal based on the pilot carrier location signal;
a pilot carrier memory operable to hold known pilot carriers and read a second pilot carrier corresponding to the detected location among the known pilot carriers based on the pilot carrier location signal;
phase difference calculating means for calculating a phase difference between the first and second pilot carriers to generate a phase difference signal indicating the phase difference;
phase change amount calculating means for calculating an amount of change of phase rotation between transmitting and receiving ends with respect to a carrier frequency based on the phase difference signal and generating a phase difference change signal indicating the amount of change; and
phase correction amount calculating means for calculating an amount of phase correction for each of the plurality of subcarriers based on the phase difference signal and the phase difference change signal and generating a phase error correcting signal.

32. The OFDM transmission system according to claim 31, wherein the orthogonal frequency division multiplexed signal is a burst-type signal comprising a plurality of symbols.

33. An OFDM transmission system for transmitting an OFDM signal generated from a plurality of subcarriers modulated with transmitted data for each given-length symbol from a transmitting end to a receiving end through a wired or radio transmission path, wherein said transmitting end comprises an OFDM modulator comprising:
differential modulation means for assigning subcarriers of known phase from among a plurality of subcarriers among transmission subcarriers used in the transmission of the OFDM signal as pilot carriers to provide phase reference, and subjecting the transmission subcarriers to differential modulation between subcarriers adjacent in frequency direction with the transmitted data with reference to the pilot carriers; and
OFDM signal generating means for generating the OFDM signal from the transmission subcarriers after the differential modulation, wherein said receiving end comprises an OFDM demodulator comprising:
Fourier transform means for separating the OFDM signal into the plurality of subcarriers by Fourier transform to generate a first subcarrier signal;
phase error calculating means for obtaining an amount of phase correction for each of the plurality of subcarriers in the first subcarrier signal based on subcarriers of known phase assigned as pilot carriers in the first subcarrier signal;
phase correcting means for correcting a phase of the first subcarrier signal based on the amounts of phase correction to generate a second subcarrier signal, and
differential demodulation means for subjecting the second subcarrier signal to differential demodulation with reference to the pilot carriers to reproduce the transmitted data, and wherein said phase error calculating means comprises:
pilot carrier extracting means for extracting a pilot carrier from the first subcarrier signal;
phase calculating means for calculating a phase of the pilot carrier based on the extracted pilot carrier;

phase change amount calculating means for calculating an amount of phase change from the calculated phase of the pilot carrier, and phase correction amount calculating means for calculating an amount of phase correction between the plurality of subcarriers based on the calculated amount of phase change, and wherein said phase correcting means corrects the phase of the first subcarrier signal based on the calculated amount of phase correction.

34. The OFDM transmission system according to claim 33, wherein the orthogonal frequency division multiplexed signal is a burst-type signal comprising a plurality of symbols.

35. An OFDM transmission system for transmitting an OFDM signal generated from a plurality of subcarriers modulated with transmitted data for each given-length symbol from a transmitting end to a receiving end through a wired or radio transmission path, wherein said transmitting end comprises an OFDM modulator comprising:

differential modulation means for assigning subcarriers of known phase from among a plurality of subcarriers among transmission subcarriers used in the transmission of the OFDM signal as pilot carriers to provide phase reference, and subjecting the transmission subcarriers to differential modulation between subcarriers adjacent in frequency direction with the transmitted data with reference to the pilot carriers; and OFDM signal generating means for generating the OFDM signal from the transmission subcarriers after the differential modulation;

wherein said receiving end comprises an OFDM demodulator comprising:

Fourier transform means for separating the OFDM signal into the plurality of subcarriers by Fourier transform to generate a first subcarrier signal;

inter-carrier phase difference calculating means for calculating a phase difference between the adjacent subcarriers based on the first subcarrier signal;

phase error calculating means for calculating an amount of phase difference correction which is an amount of correction to the phase difference between the adjacent subcarriers based on the pilot carriers included in the first subcarrier signal; and phase correcting means for correcting the phase difference between the adjacent subcarriers in accordance with the amount of phase difference correction, wherein said phase error calculating means comprises:

pilot carrier extracting means for extracting a pilot carrier from the first subcarrier signal;

phase calculating means for calculating a phase of the pilot carrier based on the extracted pilot carrier;

phase change amount calculating means for calculating an amount of phase change from the calculated phase of the pilot carrier; and phase correction amount calculating means for calculating an amount of phase correction between the plurality of subcarriers based on the calculated amount of phase change, and wherein said phase correcting means corrects the phase difference indicated by an output of said inter-carrier phase difference calculating means based on the calculated amount of phase correction.

36. The OFDM transmission system according to claim 35, wherein the orthogonal frequency division multiplexed signal is a burst-type signal comprising a plurality of symbols.

37. An OFDM demodulator for receiving an OFDM signal generated from a plurality of subcarriers modulated with transmitted data for each given-length symbol, said OFDM demodulator comprising:

subcarrier separating means for separating the OFDM signal into the plurality of subcarriers to generate a first subcarrier signal;

carrier phase error detecting means for obtaining an amount of phase correction for each of the plurality of subcarriers in the first subcarrier signal based on subcarriers of known phase assigned as pilot carriers to provide phase reference in the first subcarrier signal; and phase correcting means for correcting a phase of the first subcarrier signal based on the amounts of phase correction to generate a second subcarrier signal, wherein said carrier phase error detecting means comprises:

pilot carrier location detecting means for detecting locations of the pilot carriers in the first subcarrier signal to generate a pilot carrier location signal;

pilot carrier extracting means for extracting a first pilot carrier from the first subcarrier signal based on the pilot carrier location signal;

a pilot carrier memory operable to hold known pilot carriers and read a second pilot carrier corresponding to the detected location among the known pilot carriers based on the pilot carrier location signal;

phase difference calculating means for calculating a phase difference between the first and second pilot carriers to generate a phase difference signal indicating the phase difference;

phase change amount calculating means for calculating an amount of change of phase rotation between transmitting and receiving ends with respect to a carrier frequency based on the phase difference signal and generating a phase difference change signal indicating the amount of change; and phase correction amount calculating means for calculating an amount of phase correction for each of the plurality of the subcarriers based on the phase difference signal and the phase difference change signal and generating a phase error correcting signal.

38. An OFDM demodulation method for demodulating an OFDM signal generated from a plurality of subcarriers modulated with transmitted data for each given-length symbol, said OFDM demodulation method comprising:

separating the OFDM signal into the plurality of subcarriers to generate a first subcarrier signal;

obtaining an amount of phase correction for each of the plurality of subcarriers in the first subcarrier signal based on subcarriers of known phase assigned as pilot carriers to provide phase reference in the first subcarrier signal; and correcting a phase of the first subcarrier signal based on the amounts of phase correction to generate a second subcarrier signal, wherein said obtaining of the amount of phase correction comprises:

detecting locations of the pilot carriers in the first subcarrier signal to generate a pilot carrier location signal;

extracting a first pilot carrier from the first subcarrier signal based on the pilot carrier location signal;

holding known pilot carriers and reading a second pilot carrier corresponding to the detected location among the known pilot carriers based on the pilot carrier location signal;

calculating a phase difference between the first and second pilot carriers to generate a phase difference signal indicating the phase difference;

calculating an amount of change of phase rotation between transmitting and receiving ends with respect to a carrier frequency based on the phase difference signal and generating a phase difference change signal indicating the amount of change; and calculating an amount of phase correction for each of the plurality of subcarriers based on the phase difference signal and the phase difference change signal and generating a phase error correcting signal.

* * * * *